United States Patent
Qian

(10) Patent No.: US 9,041,822 B2
(45) Date of Patent: May 26, 2015

(54) METHOD AND SYSTEM OF INCREASING SPATIAL RESOLUTION OF MULTI-DIMENSIONAL OPTICAL IMAGERY USING SENSOR'S INTRINSIC KEYSTONE

(75) Inventor: Shen-En Qian, Quebec (CA)

(73) Assignee: CANADIAN SPACE AGENCY, Saint-Hubert, Quebec (CA)

( * ) Notice: Subject to any disclaimer, the term of this patent is extended or adjusted under 35 U.S.C. 154(b) by 0 days.

(21) Appl. No.: 13/984,590

(22) PCT Filed: Feb. 11, 2011

(86) PCT No.: PCT/CA2011/050077
§ 371 (c)(1),
(2), (4) Date: Nov. 4, 2013

(87) PCT Pub. No.: WO2012/106797
PCT Pub. Date: Aug. 16, 2012

(65) Prior Publication Data
US 2014/0043505 A1    Feb. 13, 2014

(51) Int. Cl.
*H04N 5/225* (2006.01)
*H04N 5/232* (2006.01)
(Continued)

(52) U.S. Cl.
CPC .......... *H04N 5/23232* (2013.01); *H04N 5/349* (2013.01); *G06T 3/4069* (2013.01)

(58) Field of Classification Search
CPC .. H04N 5/23232; H04N 5/349; G06T 3/4069; G06T 3/4053
USPC ................. 348/340, 345, 272, 274, 275, 277, 348/222.1, 294, 239, 218.1, 207.99
See application file for complete search history.

(56) References Cited

U.S. PATENT DOCUMENTS

| 5,500,737 A | * | 3/1996 | Donaldson et al. ........... 356/606 |
| 6,008,492 A | | 12/1999 | Slater et al. |
| 6,075,891 A | | 6/2000 | Burman |

(Continued)

FOREIGN PATENT DOCUMENTS

| WO | WO92/04701 A1 | 3/1992 |
| WO | WO2009/007054 A1 | 1/2009 |
| WO | WO2009/030698 A1 | 3/2009 |

OTHER PUBLICATIONS

Super-Resolution Reconstruction of Hyperspectral Images. Toygar Akgun, Student Member, IEEE, Yucel Altunbask, Senior Mrmber, IEEE, and Russell M. Mersereau, Fellow, IEEE.*

(Continued)

*Primary Examiner* — Ahmed A Berhan
(74) *Attorney, Agent, or Firm* — Miltons IP.p.i.

(57) ABSTRACT

A method and system for creating a high spatial resolution image from a multidimensional imagery is disclosed. The technique exploits an intrinsic spatial distortion of the sensor that acquired the imagery and uses it as additional information to increase spatial resolution of the imagery. The method comprises obtaining a baseline image from the multidimensional imagery; deriving n×m−1 sub-pixel shifted images from the multidimensional imagery, where n and m are spatial resolution increase factors in x and y directions respectively, integers and greater than 1; organizing the baseline image and the n×m−1 sub-pixel shifted images from the multidimensional imagery; fusing the organized images using iterative back projection (IBP) to generate a high resolution image; and outputting the generated high resolution image.

19 Claims, 21 Drawing Sheets

(51) Int. Cl.
*H04N 5/349* (2011.01)
*G06T 3/40* (2006.01)

(56) References Cited

U.S. PATENT DOCUMENTS

| | | | |
|---|---|---|---|
| 6,282,301 | B1 | 8/2001 | Haskett |
| 6,546,146 | B1 | 4/2003 | Hollinger et al. |
| 6,665,438 | B1 | 12/2003 | Lin |
| 6,701,021 | B1 | 3/2004 | Qian et al. |
| 6,724,940 | B1 | 4/2004 | Qian et al. |
| 6,798,360 | B1 | 9/2004 | Qian et al. |
| 6,804,400 | B1 | 10/2004 | Sharp |
| 6,813,018 | B2 | 11/2004 | Richman |
| 6,909,815 | B2 | 6/2005 | Bernstein et al. |
| 6,940,999 | B2 | 9/2005 | Lin |
| 6,952,499 | B1 | 10/2005 | Vititoe |
| 7,019,777 | B2 | 3/2006 | Sun |
| 7,116,418 | B2 | 10/2006 | Richman |
| 7,135,682 | B1 | 11/2006 | Lucey |
| 7,149,366 | B1 | 12/2006 | Sun |
| 7,194,111 | B1 | 3/2007 | Schaum et al. |
| 7,194,132 | B1 | 3/2007 | Stein |
| 7,199,876 | B2 | 4/2007 | Mitchell |
| 7,242,478 | B1 | 7/2007 | Dombrowski et al. |
| 7,251,376 | B2 | 7/2007 | Qian et al. |
| 7,260,242 | B2 | 8/2007 | Viggh |
| 7,263,226 | B1 | 8/2007 | Stein |
| 7,282,715 | B2 | 10/2007 | Barron |
| 7,283,664 | B2 | 10/2007 | Magee et al. |
| 7,319,796 | B1 | 1/2008 | Sharp |
| 7,336,353 | B2 | 2/2008 | Brady et al. |
| 7,337,065 | B2 | 2/2008 | Adler-Golden et al. |
| 7,359,050 | B1 | 4/2008 | Mitchell |
| 7,369,229 | B2 | 5/2008 | Bissett, III et al. |
| 7,379,619 | B2 | 5/2008 | Ikeda et al. |
| 7,420,679 | B2 | 9/2008 | Treado et al. |
| 7,428,324 | B2 * | 9/2008 | Crandall et al. ............... 382/128 |
| 7,433,042 | B1 | 10/2008 | Cavanaugh et al. |
| 7,491,936 | B2 | 2/2009 | Barron |
| 7,491,944 | B1 | 2/2009 | Stork et al. |
| 7,551,785 | B2 | 6/2009 | Qian et al. |
| 7,554,667 | B1 | 6/2009 | Kampe |
| 7,609,381 | B2 | 10/2009 | Warren |
| 8,213,746 | B2 * | 7/2012 | Volovelsky et al. ........... 382/299 |
| 2004/0257563 | A1 | 12/2004 | Miller |
| 2005/0104771 | A1 | 5/2005 | Terry et al. |
| 2006/0203207 | A1 | 9/2006 | Ikeda et al. |
| 2007/0036462 | A1 * | 2/2007 | Crandall et al. ............... 382/284 |
| 2007/0070354 | A1 | 3/2007 | Chao |
| 2008/0088840 | A1 | 4/2008 | Bodkin et al. |
| 2008/0129752 | A1 | 6/2008 | Riley et al. |
| 2008/0131024 | A1 | 6/2008 | Riley et al. |
| 2008/0131025 | A1 | 6/2008 | Riley et al. |
| 2008/0204744 | A1 | 8/2008 | Mir et al. |
| 2008/0260279 | A1 * | 10/2008 | Volovelsky et al. ........... 382/254 |
| 2009/0010545 | A1 | 1/2009 | Ramsay et al. |
| 2009/0018801 | A1 | 1/2009 | Gladkova et al. |
| 2009/0074297 | A1 | 3/2009 | Robinson |
| 2009/0144350 | A1 | 6/2009 | Chang |
| 2009/0175526 | A1 | 7/2009 | Ramsay et al. |
| 2010/0123809 | A1 * | 5/2010 | Egawa ........................ 348/280 |

OTHER PUBLICATIONS

David P. Roy., "The impact of misregistration upon composited wide field of view satellite data and implications for change detection", In: IEEE Transactions on Geoscience and Remote Sensing, vol. 38, No. 4, Jul. 2000, pp. 2017-2032.

Irani, et al., "Improving Resolution by Image Registration", In: Graphical Models and Image Proc., vol. 53, May 1991, pp. 231-239.

Hardie, et al., "Joint MAP registration and high-resolution image estimation using a sequence of undersampled images", In: IEEE Transactions on Image Processing, vol. 6, No. 12, Dec. 1997, pp. 1621-1633.

Tom, et al., "Reconstruction of a high-resolution image by simultaneous registration, restoration, and interpolation of low-resolution images", In: Proc. 1995 IEEE Int. Conf. Image Processing, vol. 2, Oct. 1995, pp. 532-542.

Tekalp, et al., "High-resolution image reconstruction from lower-resolution image sequences and space varying image restoration", In: Proc, IEEE Int. Conf. Acoustics, Speech and Signal Processing (ICASSP), vol. 3, Mar. 1992, pp. 169-172.

Zavorin, et al., "Use of multiresolution wavelet feature pyramids for automatic registration of multisensor imagery", In: IEEE Transactions on Image Processing, vol. 14, No. 6, Jun. 2005, pp. 770-782.

Schultz, et al., "Extraction of high-resolution frames from video sequences", In: IEEE Transactions on Image Processing, vol. 5, No. 6, Jun. 1996, pp. 996-1011.

Clark, et al., "A transformation method for the reconstruction of functions from nonuniformly spaced samples", In: IEEE Transactions on Acoustics, Speech, and Signal Processing, vol. ASSP-33, No. 4, Oct. 1985, pp. 1151-1165.

* cited by examiner

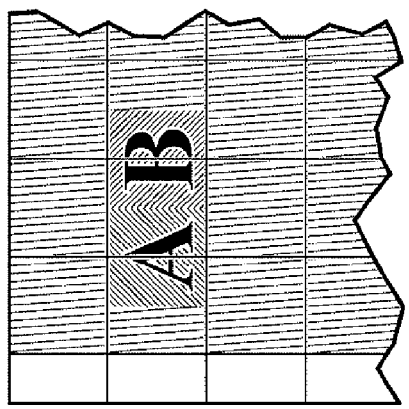
$I_{10}$
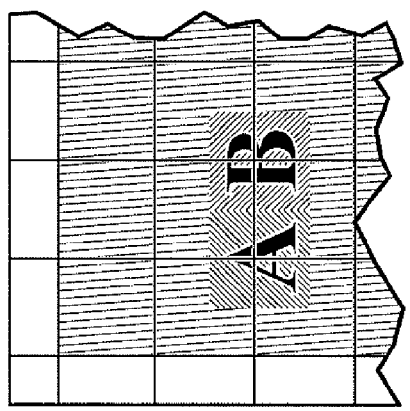
$I_{11}$
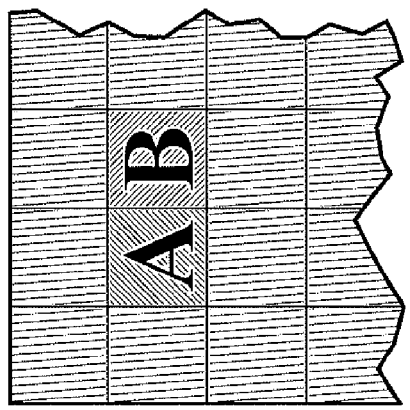
$I_{00}$
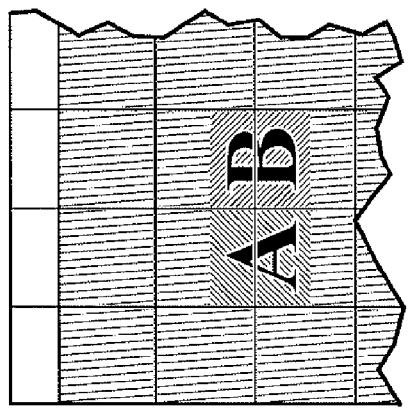
$I_{01}$
FIGURE 9

METHOD AND SYSTEM OF INCREASING SPATIAL RESOLUTION OF MULTI-DIMENSIONAL OPTICAL IMAGERY USING SENSOR'S INTRINSIC KEYSTONE

TECHNICAL FIELD

The present application relates to a method and system of increasing spatial resolution of multi-dimensional optical imagery based on sensor's intrinsic spatial distortion, such as keystone, using a signal processing approach.

BACKGROUND

Spatial resolution, also referred to as ground sample distance (GSD), is one of the key parameters in design and building of an imaging satellite sensor. Satellite data users typically prefer to receive images with high spatial resolution in order to better serve their applications. Designing and building a satellite sensor with a considerably high spatial resolution can be prohibitively expensive and/or constrained by technology availability.

Image fusion is one way to increase spatial resolution of satellite images. Multiple images of the same scene observed by the same sensor at different times or observed by different sensors at either the same time or different times are fused to attain a high spatial resolution image. This is explained in C. Pohl and J. L. Van Genderen, "Multisensor image fusion in remote sensing: concept, methods and applications." *Int. J. Remote Sensing*, Vol. 19, No. 5, pp. 823-854, 1998, hereinafter "Pohl et al.". In the case of multispectral or hyperspectral sensors, spatial resolution of multispectral or hyperspectral imageries can be enhanced by fusing the low resolution multispectral or hyperspectral imageries with a high spatial resolution panchromatic (PAN) image that was acquired simultaneously by the PAN instrument onboard the same satellite. However, the image fusion based spatial resolution enhancement approach requires multiple observed images of the same scene, or the high spatial resolution PAN image being available. In practice, these images may not be always available. Even if the multiple images of the same scene or the high spatial resolution PAN image are available, it is a nontrivial task to fuse the images to precisely enhance the spatial resolution. For example, the orbit, review angle and weather conditions may change the appearance of an area between passes of a satellite over the area.

An accurate geometric registration and the radiometric normalization of the images to be fused are crucial to image fusion, since the multiple images of the same scene acquired by different sensors or by the same sensor at different times are inconsistent, as explained in P. R. Coppin and M. E Bauer, "Digital change detection in forest ecosystems with remote sensing imagery." *Remote Sensing of Reviews*, 13, 207-234, 1996. The multiple images may not have a common geometric base and a common radiometric base. Without a common geometric base, the multiple images of the same scene are not associated with each other for the spatial information. This makes precise spatial resolution enhancement difficult. As explained in D. P. Roy, "The impact of misregistration upon composited wide field of view satellite data and implications for change detection." *IEEE Transactions on Geoscience and Remote Sensing*, Vol. 38 No. 4, 2017-2032, 2000, the fidelity of the fused images is dependent on the accurate registration of the multiple images to a common spatial framework. Image registration techniques have been developed for a long time. However, to date, it is still rare to find an accurate, robust and automatic image registration technique. Manual registration remains by far the most common way to accurately align images, although it is often time consuming and inaccurate, as indicated, for example, in I. Zavorin and J. Le Moigne, "Use of multiresolution wavelet feature pyramids for automatic registration of multisensor imagery." *IEEE Transactions on Image Processing*, Vol. 14, No. 6, pp. 770-782, 2005.

Without a common radiometric base, it is difficulty to fuse the multiple images of the same scene that were acquired at different illumination and atmospheric conditions, view angles, or sensor parameters, because these variations cause pixel intensity difference in the images, while this difference does not reflect the actual object difference in the scene. The multiple images of the same scene need to be well normalized to a common radiometric framework. Inaccurate radiometric normalization of the multiple images of the same scene severely compromises the quality of the fused image.

SUMMARY

A technique for increasing spatial resolution of multi-dimensional spectral imageries, such as airborne and satellite imageries, based on a sensor's characteristic has been developed by the applicant. This technique can increase spatial resolution of acquired sensor imageries without using any additional images. The technique exploits an intrinsic spatial distortion, referred to as "keystone" hereinafter, of the sensor that acquired the imageries and uses it as additional information to increase spatial resolution of the imageries. Since multiple images of the same scene are no longer required, the enhancement of spatial resolution is irrespective of the geometric registration and the radiometric normalization of the images.

In one aspect, there is provided a method for creating a high spatial resolution image from a multidimensional imagery, the method comprising: obtaining a baseline image from the multidimensional imagery; deriving n×m−1 sub-pixel shifted images from the multidimensional imagery, where n and m are integers and greater than 1; organizing the baseline image and the n×m−1 sub-pixel shifted images from the multidimensional imagery; fusing the organized images using iterative back projection (IBP) to generate a high resolution image; and outputting the generated high resolution image.

In an embodiment, obtaining the baseline image comprises selecting and extracting a band image from the multidimensional imagery from a region of band images with relative high intensity amplitude and a flat intensity variation.

In an embodiment, deriving the n×m−1 sub-pixel shifted images comprises selecting and extracting n×m−1 band images from the multidimensional imagery according to a predefined amount of keystone induced sub-pixel shift between the baseline image and the selected band images.

In an embodiment, deriving the n×m−1 sub-pixel shifted images comprises deriving n×m−1 synthetic images, each synthetic image being composed of columns extracted from different band images, all of the columns of each synthetic image having close to the predefined pixel shift related to the baseline image.

In an embodiment, deriving the n×m−1 sub-pixel shifted images comprises deriving n×m−1 synthetic images, each of the n×m−1 synthetic images comprising each pixel having $1^{st}$, $2^{nd}$, until $(n \times m-1)^{th}$ closest intensity to the pixel at the same location of the baseline image in all bands of the multidimensional imagery.

In an embodiment, the method further comprises normalizing the n×m−1 sub-pixel shifted images with respect to the baseline image.

In an embodiment, for a spatial resolution enhancement factor of n×m, organizing the baseline image and the n×m−1 sub-pixel shifted images comprises: placing the baseline image as the leftmost sub-pixel shifted image in the $1^{st}$ line of the organized image array; correcting a first of the n×m−1 sub-pixel shifted images to a zero keystone shift in relation to the baseline image; shifting the corrected image down 1/m pixels and placing the image as the leftmost sub-pixel shifted image in the 2nd line of the organized image array; correcting an image of the n×m−1 sub-pixel shifted images to a zero keystone shift in relation to the baseline image; shifting the corrected image down until (m−1)/m pixels and placing the (m−1)/m down shifted image as the leftmost sub-pixel shifted image in the $m^{th}$ line of the organized image array; resampling an image of the n×m−1 sub-pixel shifted images to a 1/n right shift and placing the 1/n right shifted image as the $2^{nd}$ leftmost sub-pixel shifted image in the 1st line of the organized image array; resampling an image of the n×m−1 sub-pixel shifted images to until a (n−1)/n right shift and placing the (n−1)/n right shifted image as the $n^{th}$ sub-pixel shifted image in the $1^{st}$ line of the organized image array; and resampling an image of the n×m−1 sub-pixel shifted images to a (n−1)/n right shift and to a (m−1)/m down shift and placing the (n−1)/n right shifted, (m−1)/m down shifted image as the nth sub-pixel shifted image in the $m^{th}$ line of the organized image array.

In an embodiment, for a spatial resolution enhancement factor of n×m, organizing the baseline image and the n×m−1 sub-pixel shifted images comprises: correcting a first of the n×m−1 sub-pixel shifted images to a zero keystone shift in relation to the baseline image; shifting the corrected image down 1/m pixels and placing the 1/m down shifted image as the leftmost sub-pixel shifted image in the $2^{nd}$ line of the organized image array; correcting an image of the n×m−1 sub-pixel shifted images to a zero keystone shift in relation to the baseline image; shifting the corrected image down until (m−1)/m pixels and placing the (m−1)/m down shifted image as the leftmost sub-pixel shifted image in the $m^{th}$ line of the organized image array; resampling (n−1) images of the n×m−1 sub-pixel shifted images to a 1/m down shift and placing the (n−1) resampled 1/m down shifted images as the sub-pixel shifted images in the $2^{nd}$ line of the organized image array; and resampling (n−1) images of the n×m−1 sub-pixel shifted images to a (m−1)/m down shift and placing the (n−1) resampled (m−1)/m down shifted images as the sub-pixel shifted images in the $m^{th}$ line of the organized image array.

In an embodiment, for a spatial resolution enhancement factor of n×m, each of n−1 sub-pixel shifted images is shifted by approximately j/m in a vertical direction, where j is an integer from 1 to m−1.

In an embodiment, for a spatial resolution enhancement factor of n×m, placing the (n−1) resampled j/m down shifted images as the sub-pixel shifted images in the $(j+1)^{th}$ line of the organized image array comprises placing the (n−1) sub-pixel shifted images from left to right of the organized image array based on the order the amount of keystone induced shift from small to large, where j is an integer from 1 to m−1.

In an embodiment, the IBP comprises 10 or more iterations.

In an embodiment, the baseline image and the n×m−1 sub-pixel shifted images are spectral band images.

In an embodiment, the method further comprises fusing the generated high resolution image to each of a plurality of band images of the multidimensional imagery and outputting an entire spatial resolution enhanced multidimensional imagery.

In an embodiment, fusing the generated high resolution image to each of the plurality of band images comprises: performing a Radon transform on the generated high resolution image and on each of the plurality of band images to produce a Radon slice for the high resolution image and each band image; applying a dual-tree complex wavelet transform (DTCWT) to each Radon slice to produce a complex ridgelet coefficients (CRC) for each Radon slice; fusing the CRC corresponding to the generated high resolution image with the CRCs corresponding to each of the plurality of band images; and performing an inverse complex ridgelet transform to generate the enhanced spatial resolution multidimensional imagery.

In an embodiment, the method further comprises normalizing an intensity of each of the plurality of band images before fusing the high resolution image to respective band image.

In an embodiment, the method further comprises extending the spatial resolution of each of the plurality of band images prior to fusing the generated high resolution image to the respective band image.

In an embodiment, the plurality of band images comprises all band images for the multidimensional imagery.

In an embodiment, the plurality of band images comprises a set of band images from the multidimensional imagery that meet at least one predefined criterion.

In an embodiment, wherein the multidimensional imagery is a datacube.

In an embodiment, the multidimensional imagery is a datacube generated by pushbroom imaging spectrometers.

In an embodiment, the multidimensional imagery is an image generated by a whiskbroom imaging spectrometer.

In an embodiment, the multidimensional imagery is an image generated by an Aurora sensor.

In an embodiment, the multidimensional imagery is an image generated by a Short Wave Infrared Full Spectrum Imager.

In another aspect, there is provided a computer-readable medium having computer-readable instructions stored thereon that when executed by a processor cause the processor to implement any one of the methods described herein.

In another aspect, there is provided a system comprising: a processor; an input interface for receiving a multidimensional imagery; display; a memory having computer-readable instructions stored thereon that when executed by the processor cause the processor to: receive the multidimensional imagery from the input interface; implement any one of the methods described herein; and output the generated high resolution image to the display.

In an embodiment, the instructions further cause the processor to output an enhanced multidimensional imagery to at least one of the display and a printer.

BRIEF DESCRIPTION OF THE DRAWINGS

FIG. 3(*b*) is a contour plot of spatial shift caused by keystone of an SFSI sensor (relative to reference band image 144);

FIG. 9 illustrates four multiple observation images with sub-pixel shift to be input to IBP (Iterative Back-Projection) for fusion;

FIG. 11(*b*) illustrates the targets of FIG. 11(*a*) viewed by the IKONOS satellite in the panchromatic scene (1 m resolution);

Like reference numerals are used in the drawings to denote like elements and features.

DETAILED DESCRIPTION

Keystone—Sensor's Intrinsic Characteristic

A pushbroom imaging spectrometer, such as Hyperion (on board EO-1 satellite), SFSI (Short-Wave-Infra-Red Full Spectrum Imager) and CASI (Compact Airborne Spectrographic Imager), employs a two-dimensional (2-D) detector array. The spectrum is dispersed in one dimension, for example along the columns of the detector array, and the spatial field is oriented along the rows of the detector array. Ideally this type of imaging spectrometer generates 2-D (spectral-spatial) frames of data in which all the entries in a given column image the same ground sample as shown on the left graphics of FIG. 1. Due to geometric distortion, as can be seen in camera lenses, or chromatic aberration, or a combination of both, inter-band spatial mis-registration occurs as shown on the right graphics of FIG. 1. This spatial distortion or mis-registration is often called keystone (KS). Keystone refers to the across-track direction spatial mis-registration of the ground sample pixels of the various spectral bands of the spectrograph. Because the detector elements are arranged on a rectilinear grid, the presence of keystone prevents the registration of a given ground sample pixel onto the elements of a single column in the detector array. Instead, a particular spatial pixel number in one spectral band, corresponding to a specific detector element number in the across-track dimension, will not be registered on the ground sample pixel with the corresponding pixel number in the other spectral bands. This means that if two neighbouring ground samples are different targets (e.g. A and B in FIG. 2), with different spectra, then the spectrum measured by the sensor will be a mixture of the spectra of the two different target materials in which the fractional content of each material, and each spectrum, will vary with band number or wavelength.

Figure 1:
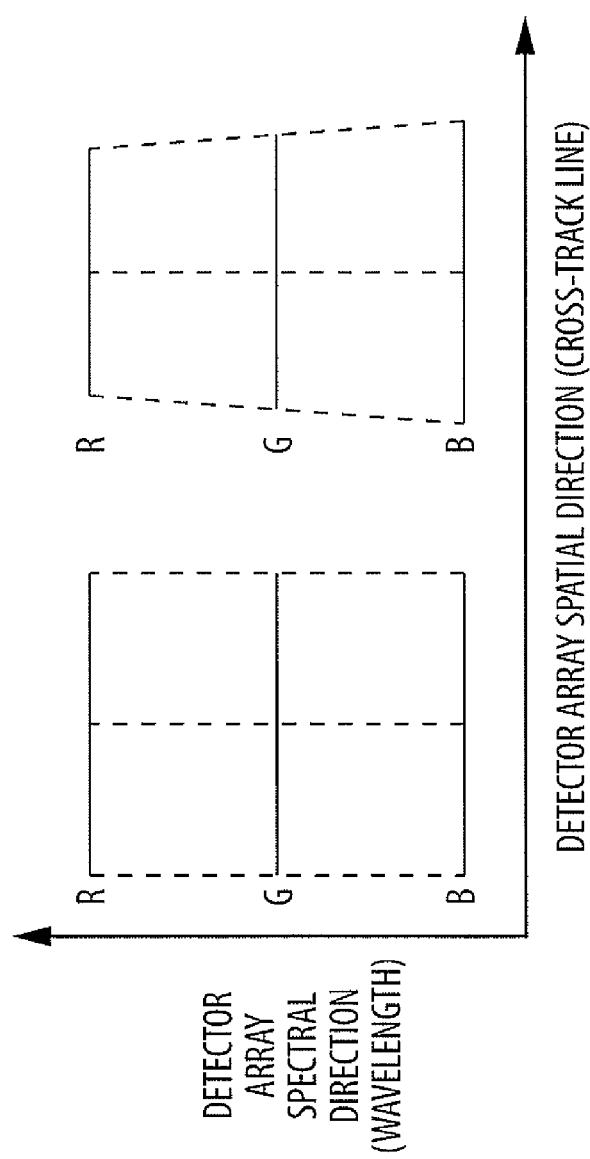
FIG. 1 is a schematic of spatial distortion (keystone) of a pushbroom imaging spectrometer.
Figure 2:
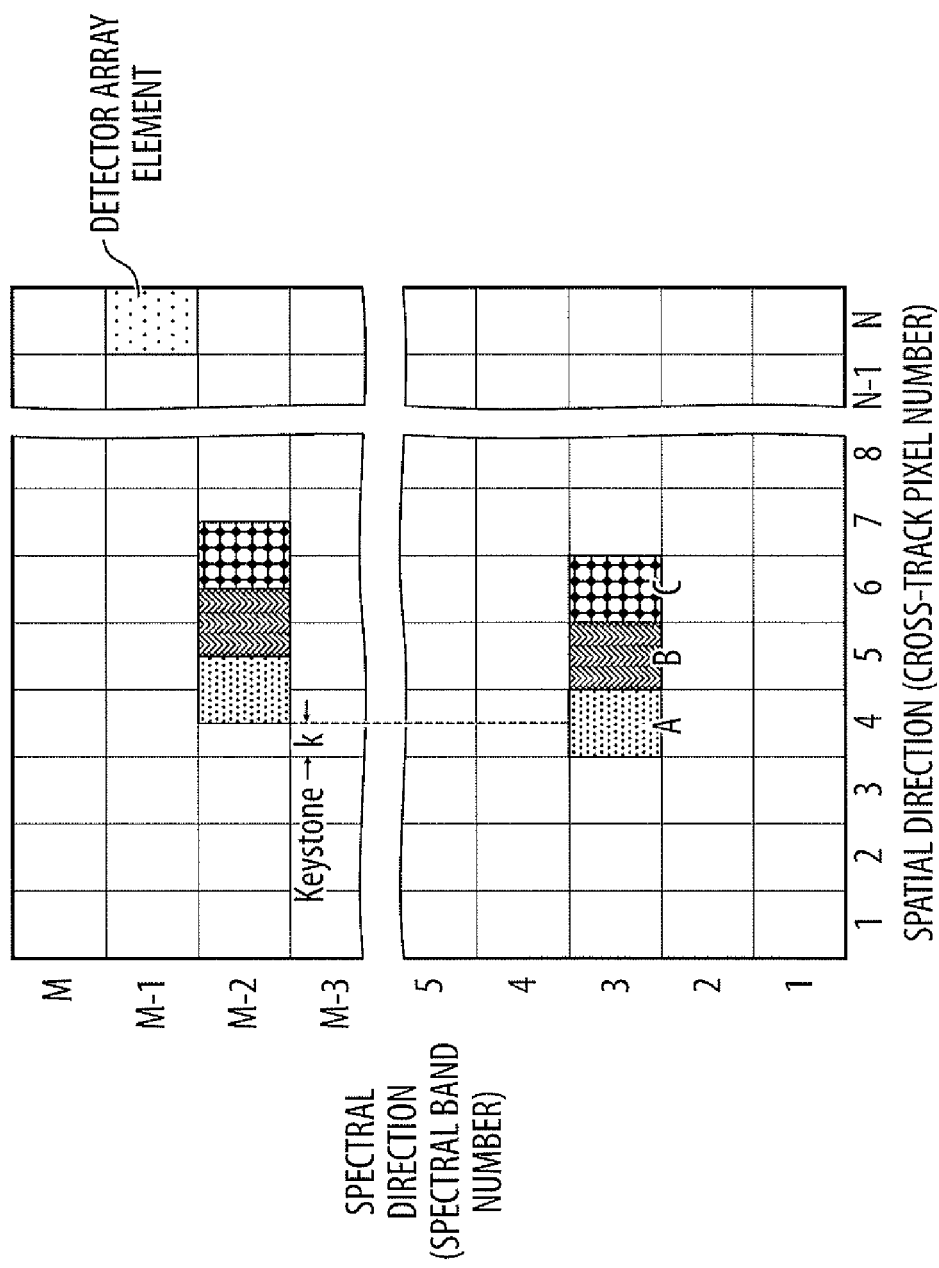
FIG. 2 is an illustration of spatial shift of ground sample pixels (A, B and C) imaged in a detector array varying with spectral band number or wavelength caused by keystone.

FIG. 1, referred to in the previous paragraph is a schematic of spatial distortion (keystone) of a pushbroom imaging spectrometer. On the left, the lines for blue (B), green (G) and red (R) are all straight, parallel and aligned with the detector array. On the right, the lines G and R are shorter than line B because of keystone. The amount of keystone is measured by the difference in length between the lines B and R. FIG. 2 illustrates spatial shift of ground sample pixels (A, B and C) imaged in a detector array varying with spectral band number or wavelength caused by keystone.

Keystone occurs in every pushbroom imaging spectrometer. Even a whiskbroom imaging spectrometer, such as AVIRIS (Airborne Visible/Infrared Imaging Spectrometer), exhibits an amount of keystone (R. A. Neville, L. Sun and K. Staenz, "Detection of keystone in image spectrometer data," *Proceedings of SPIE, vol.* 5425, pp. 208-217, 2004, hereinafter "Neville et al"). Keystone makes it difficult to identify material species in a spatially variable scene from the acquired imageries. The spatial distortion, i.e., keystone is a key parameter in designing and building an imaging spectrometer. Designing and building an imaging spectrometer with considerably small keystone is one of the struggling goals in the development of the instrument (A. Hollinger, M. Bergeron, M. Maszkiewicz, S.-E. Qian, H. Othman, K. Staenz, R. A. Neville and D. G. Goodenough, "Recent Developments in the Hyperspectral Environment and Resource Observer (HERO) Mission," *Proceedings IGARSS'2006 IEEE International Geoscience and Remote Sensing Symposium*, pp. 1620-1623, July 2006.). For acquired imageries, the spatial distortion caused by the keystone of the imaging spectrometers needs to be sufficiently corrected before the imageries are applied to derive productive information in order to reduce the effect of keystone on the applications (K. Staenz, T. Szeredi, and J. Schwarz, ISDAS—A System for Processing/Analyzing Hyperspectral Data. *Canadian Journal of Remote Sensing*, Vol, 24, No. 2, pp. 99-113, 1998).

In contradiction to the negative impact of keystone, on the other hand, the keystone effect results in targets on the ground being imaged in a detector array with spatial shift varying with spectral band number or wavelength. For example, ground pixels A, B and C imaged in Band M-2 as shown in FIG. 2 are shifted by k-pixel compared to those imaged in Band 3 due to keystone distortion. This keystone-induced spatial shift of the same ground sample pixels in different band images is additional information. It carries similar spatial information as multiple observations of the same scene. This spatial information is utilized in embodiments described herein to enhance the spatial resolution of the imageries.

Figure 3A:
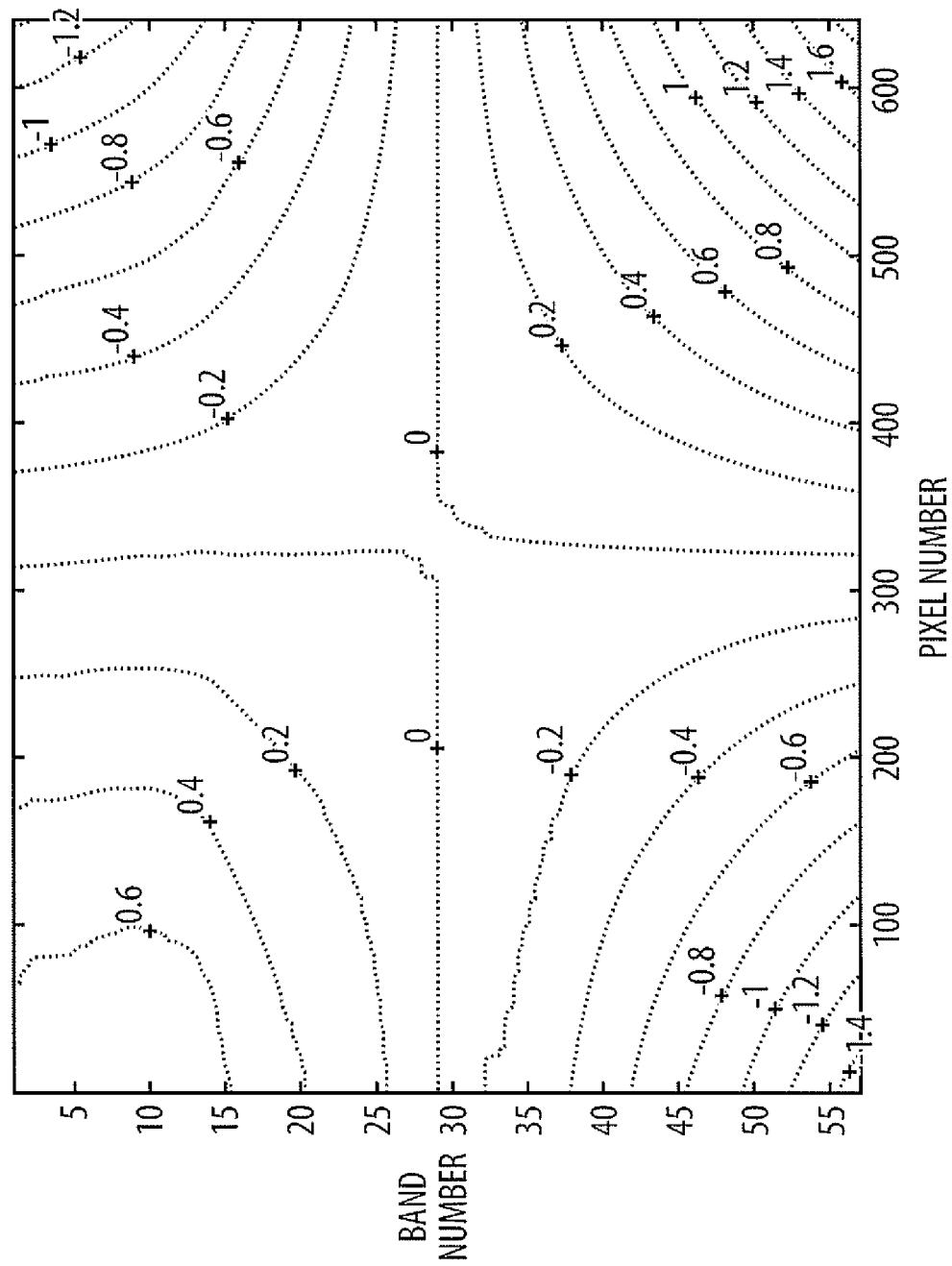
FIG. 3(*a*) is a contour plots of spatial shift caused by keystone of an Aurora sensor (relative to reference band image 29)

The keystone amount varies with spatial locations and spectral bands in a detector array. The overall keystone amount of an imaging spectrometer is a combination of a so-called 'classic' keystone and rotational misalignment of the instrument. Neville et al. have developed a method to detect and measure keystone amount of an imaging spectrometer using an image data set (also called a datacube) acquired by the instrument based on the inter-band correlation of spatial features in the scene. FIGS. 3(*a*) and 3(*b*) display two contour plots of spatial shift of band images relative to a reference band image. The graph of FIG. 3(a) shows the contour plot of spatial shifts of an Aurora sensor relative to the reference band image (29) acquired by the sensor. The Aurora sensor is a 640 pixel by 57 spectral band airborne imaging spectrometer which covers the visible and near infrared (VNIR) spectral range (394.50 nm to 933.22 nm). A positive value is to the right shift and a negative value is to the left shift. Shift values in the upper left quadrant of the contour plot are positive, indicating that these pixels are shifted to the right by amounts which are proportional to their distance from the vertical and horizontal centre-lines of the array. Shift values in the upper right quadrant are negative, indicating that these pixels are shifted to the left. The overall symmetry of the contour lines and the fact that the zero-shift contour aligns quite well with the centre across-track pixel are indicative of the precision of the opto-mechanical alignment of the instrument. This indicates that the spatial mis-registration is attributed almost exclusively to the classic keystone. In the particular example of FIG. 3(a), the maximum and minimum spatial shifts relative to the reference band image are 1.91 pixels and −1.51 pixels, respectively, for an overall maximum shift of 3.42 pixels.

Figure 3B:
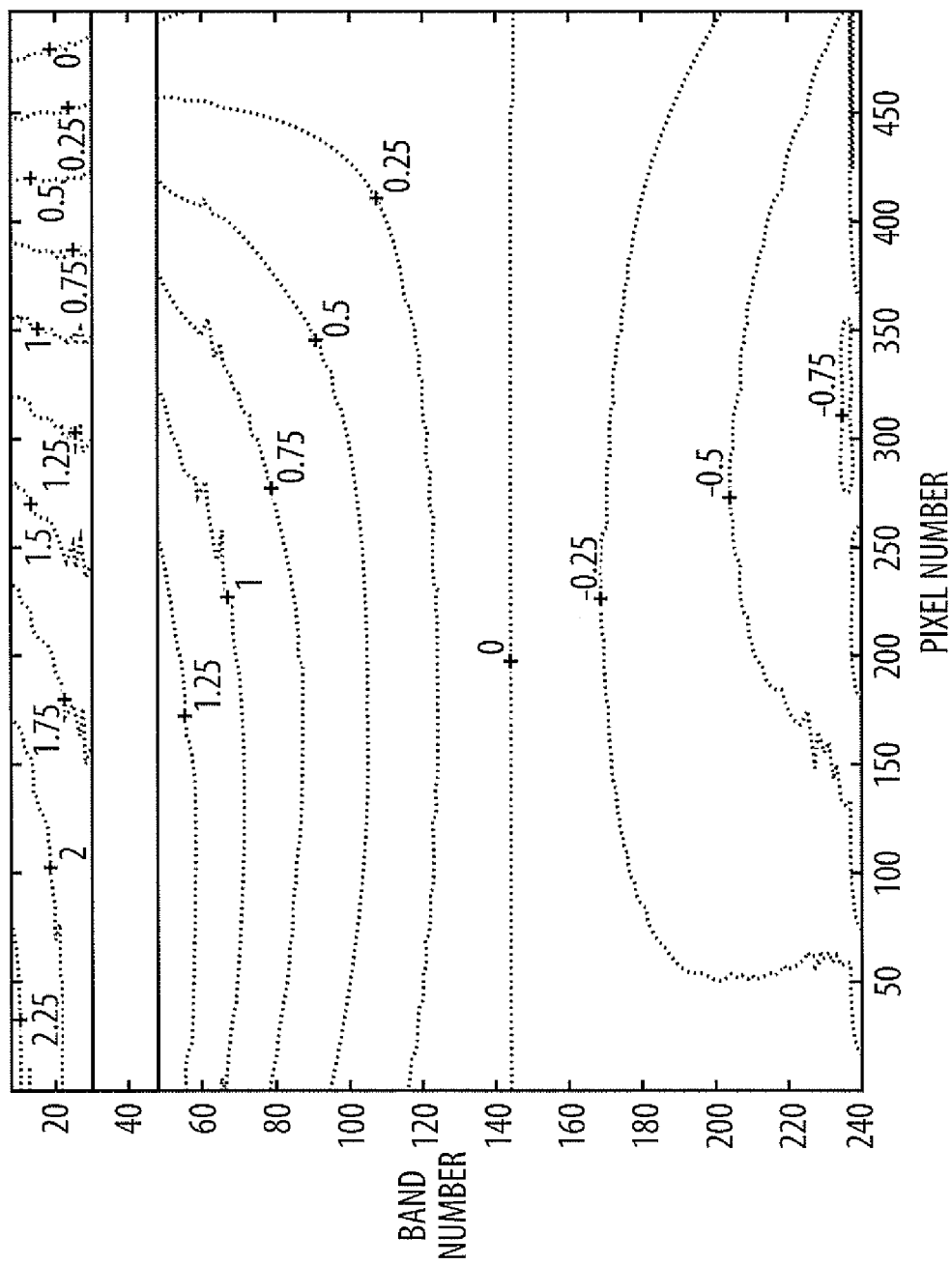

The graph of FIG. 3(b) depicts the contour plot of spatial shifts relative to the reference band image (144) acquired by the SWIR (Short wave infrared) Full Spectrum Imager (SFSI) (R. A. Neville, N. Rowlands, R. Marois, and I. Powell, "SFSI: Canada's First Airborne SWIR Imaging Spectrometer", *Canadian Journal of Remote Sensing,* 21, 328-336, 1995). The SFSI is a pushbroom imaging spectrometer with 496 pixels across-track and 240 spectral bands covering a SWIR spectral range of 1217.3 nm to 2427.9 nm. Band images 30 to 48 are blanked out in the plot due to the strong water vapour atmospheric absorption region (~1400 nm) where the sensor signal approaches zero. In this example, the maximum and minimum spatial shifts relative to the reference band image are 2.31 pixels and −0.78 pixels, respectively, for a total span of 3.09 pixels. The corresponding mean RMS (Root Mean Square) keystone measure is 0.598 pixels. The measured keystone results indicate that the upper half of the SFSI instrument rotates to the right and the lower half rotates to the left.

Using KS to Increase Spatial Resolution of a Single Band Image

This section describes the exploitation of the additional information hidden in the spatially shifted images of different bands induced by keystone distortion and how to utilize the information to increase spatial resolution of a single band image.

Fusion of Sub-Pixel Shifted Images

Image fusion methods have been developed to reconstruct a high resolution (HR) image by fusing sub-pixel shifted low resolution (LR) images of the same scene. These methods can be generally categorized into five approaches: nonuniform interpolation, frequency domain reconstruction, regularized reconstruction, projection onto convex sets, and iterative back-projection.

The nonuniform interpolation approach fuses the LR images by first estimating relative motion of the images, then nonuniformly interpolating the images onto an HR grid to produce an HR resolution image, and finally de-blurring the HR image based on the observation model. Examples of this method are described in further detail in Papoulis, A. "Generalized sampling theorem," IEEE Trans. Circuits System vol. 24, pp. 652-654, November 1977; J. L. Brown, "Multichannel sampling of low pass signals," IEEE Trans. Circuits System, vol. CAS-28, pp. 101-106, February 1981, J. J. Clark, M R. Palmer and P. D. Laurence, "A transformation method for the reconstruction of functions from nonuniformly spaced samples," IEEE Trans. Acoust., Speech, Signal Processing, vol. ASSP-33, pp. 1151-1165, 1985 and S. P. Kim and N. K. Bose, "Reconstruction of 2-D band limited discrete signals from nonuniform samples," Proc. Inst. Elec. Eng., vol. 137, pt. F, pp. 197-204, June 1990.

The frequency domain approach reconstructs an HR image based on the relationship between LR images and a desired HR image resulting from the relative motion between the LR images and the aliasing existing in each LR image (Tsai, R. Y. and T. S. Huang, "Multipleframe image restoration and registration," in Advances in Computer Vision and Image Processing. Greenwich, Conn.: JAI Press Inc., pp. 317-339, 1984.).

The regularized approach includes constrained least squares and maximum a posteriori HR image reconstruction methods according to the procedures adopted to stabilize the inversion of ill-posed problems because of an insufficient number of LR images and ill-conditioned blur operators (A. K. Katsaggelos, Digital Image Restoration. Heidelberg, Germany: Springer-Verlag. Springer. vol. 23, 1991; [16] P. B. Cheeseman, Kanefsky, R. Kraft, J. Stutz and R. Hanson, "Super-resolved surface reconstruction from multiple images," NASA Ames Research Center, Moffett Field, Calif., Tech. Rep. FIA-94-12, December 1994; B. C. Tom and A. K. Katsaggelos, "Reconstruction of a high-resolution image by simultaneous registration, restoration, and interpolation of low-resolution images," Proc. 1995 IEEE Int. Conf. Image Processing, vol. 2, Washington, D.C., pp. 539-542, October 1995; R. R. Schulz and R. L. Stevenson, "Extraction of high-resolution frames from video sequences," IEEE Trans. Image Processing, vol. 5, pp. 996-1011, June 1996; and R. C. Hardie, K. J. Barnard and E. E. Armstrong, "Joint MAP registration and high-resolution image estimation using a sequence of undersampled images," IEEE Trans. Image Processing., vol. 6, pp. 1621-1633, December 1997).

The projection onto convex sets is an iterative approach to incorporating prior knowledge of the solution into the reconstruction process. With the estimates of registration parameters, this method simultaneously solves the restoration and interpolation problem to estimate the HR image (H. Stark H. and P. Oskoui, "High resolution image recovery from image-plane arrays, using convex projections," J. Opt. Soc. Am. A, vol. 6, pp. 1715-1726, 1989; and A. M. Tekalp, M. K. Ozkan and M. I. Sezan, "High-resolution image reconstruction from lower-resolution image sequences and space varying image restoration," in Proc. IEEE Int. Conf. Acoustics, Speech and Signal Processing (ICASSP), San Francisco, Calif., vol. 3, March 1992, pp. 169-172).

The iterative back-projection (IBP) approach iteratively uses the current best estimated HR image to create the simulated LR images and then compare the simulated LR images to the observed LR images to create difference images. These difference images are then used to improve the initial estimation by "back projecting" each value in the difference image onto the HR image (M. Irani and S. Peleg, (1991) "Improving resolution by image registration," CVGIP: Graphical Models and Image Proc., vol. 53, pp. 231-239, May 1991; and M. Irani and S. Peleg, (1993) "Motion analysis for image enhancement resolution, occlusion, and transparency," J. Visual Commun. Image Represent., vol. 4, pp. 324-335, December 1993).

In this disclosure, the IBP image fusion approach is adopted to integrate the images with sub-pixel shift derived by exploiting the keystone characteristics to produce an HR single band image. One advantage of the IBP approach is that it does not have constraints on the motion of the multiple images and allows arbitrary motion such as translation, rotation and scaling. IBP converges quickly and allows for the inclusion of other fast convergence methods. Additionally, IBP is not computationally complex and thus does not require excessive computing power. IBP only deals with simple projection operation so that it can meet the need of real-time processing. It also includes iterative deconvolution. IBP can be regarded as an iteratively de-blurring operation. It is not necessary to do the pre-filtering and post-filtering operations that have to be done to compensate high-frequency components in other approaches.

In this specification, the spatial resolution increase factor is defined as n×m, where n and m are integers and greater than 1. "n" stands for a spatial resolution increase factor in the x direction and "m" for a spatial resolution increase factor in the y direction. When n=m, the aspect ratio is 1:1, i.e. squared.

Without loss of generality, let us see how spatial resolution increase with a factor of n×m=2×2, can be obtained using the sub-pixel shifted images derived by exploiting the keystone characteristics. This factor can be generalized to other numbers for squared or non-squared. To produce an HR image with a spatial resolution increase of factor of n×m=2×2, the IBP image fusion approach requires n×m=2×2=4 sub-pixel shifted LR images that have been suitably geometrically registered and radiometrically normalized. To produce an HR image with a spatial increase factor of n×m=3×3, the IBP fusion approach requires 3×3=9 sub-pixel shifted LR images. In theory for a spatial resolution increase of factor n×m, when n=m, $n^2$, sub-pixel shifted LR images are required. For a spatial resolution increase with a 3:2 aspect ratio, n×m=3×2=6 sub-pixel shifted LR images are required, of which 3 are shifted in the x direction and 2 in the y direction.

In this disclosure, three non-limiting methods are proposed to derive n×m=2×2=4 sub-pixel shifted images from a multi-dimensional imagery (a three-dimensional imagery is also referred to as a datacube) by exploiting the keystone characteristics. The methods are implemented in some embodiments by a processor executing computer-readable instructions stored on a computer-readable medium. Non-limiting examples of processors that can be used are: central processing unit (CPU), multi-core CPU, graphical processing unit (GPU), general-purpose signal processor (GSP), field programmable gated array (FPGA), and application specific integrated circuit (ASIC).

Method 1—Separate Band Images Extracted Based on KS Induced Sub-Pixel Shift

Figure 4:
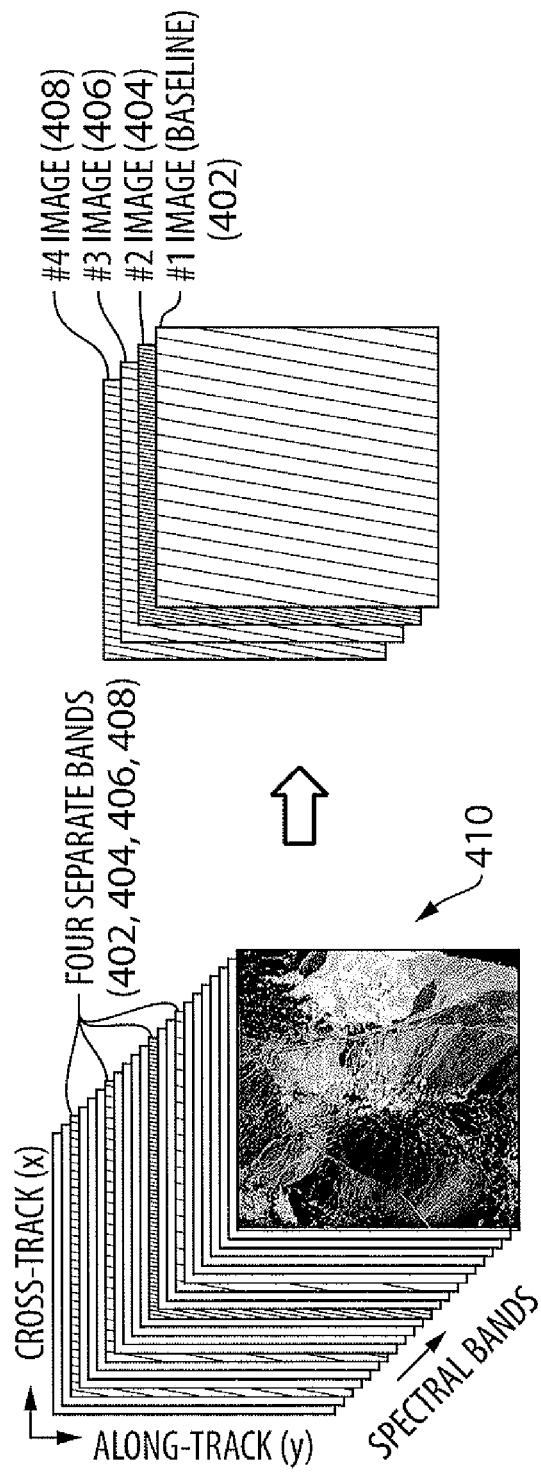
FIG. 4 illustrates a baseline image and three spectral band images extracted from a datacube to be enhanced based on keystone induced sub-pixel shift related to the baseline image.

Referring now to FIG. 4, a first method of deriving sub-pixel shift images will be described. In Method 1, a band image 402 is first selected and extracted from a datacube 410 to be enhanced for GSD and is taken as the reference for relating sub-pixel shifts to other band images. This image is referred to as the baseline image in this disclosure. The baseline image is normally selected from a spectral region with relative high spectrum amplitudes and a flat spectrum variation. Three band images 404, 406 and 408 then are selected and extracted from the datacube 410 according to the overall KS induced sub-pixel shift between the baseline image and the selected band images being close to the ideal sub-pixel shift. For spatial resolution enhancement with a factor of 2×2 the ideal sub-pixel shift is around ½-pixel. In order to reduce the impact of noise and spectrum variation between the images, these images are normally picked up from a spectral region with relative high spectrum amplitudes and a flat spectrum variation. For spatial resolution enhancement with a factor of 3×3, ⅓ pixel shift between images is ideal. For spatial resolution enhancement with a factor of n×m, when n=m, 1/n pixel step shift is ideal. Normally spatial shifts of the pixels between the baseline image and a selected band image are not the same. This is because the keystone amounts of the pixels of a band image vary across spatial direction in the detector array as shown in FIG. 3. Thanks to the nature of successive approximation in the iteration of the ISP integration process, any sub-pixel shift will contribute to the enhancement of spatial resolution.

Figure 5:
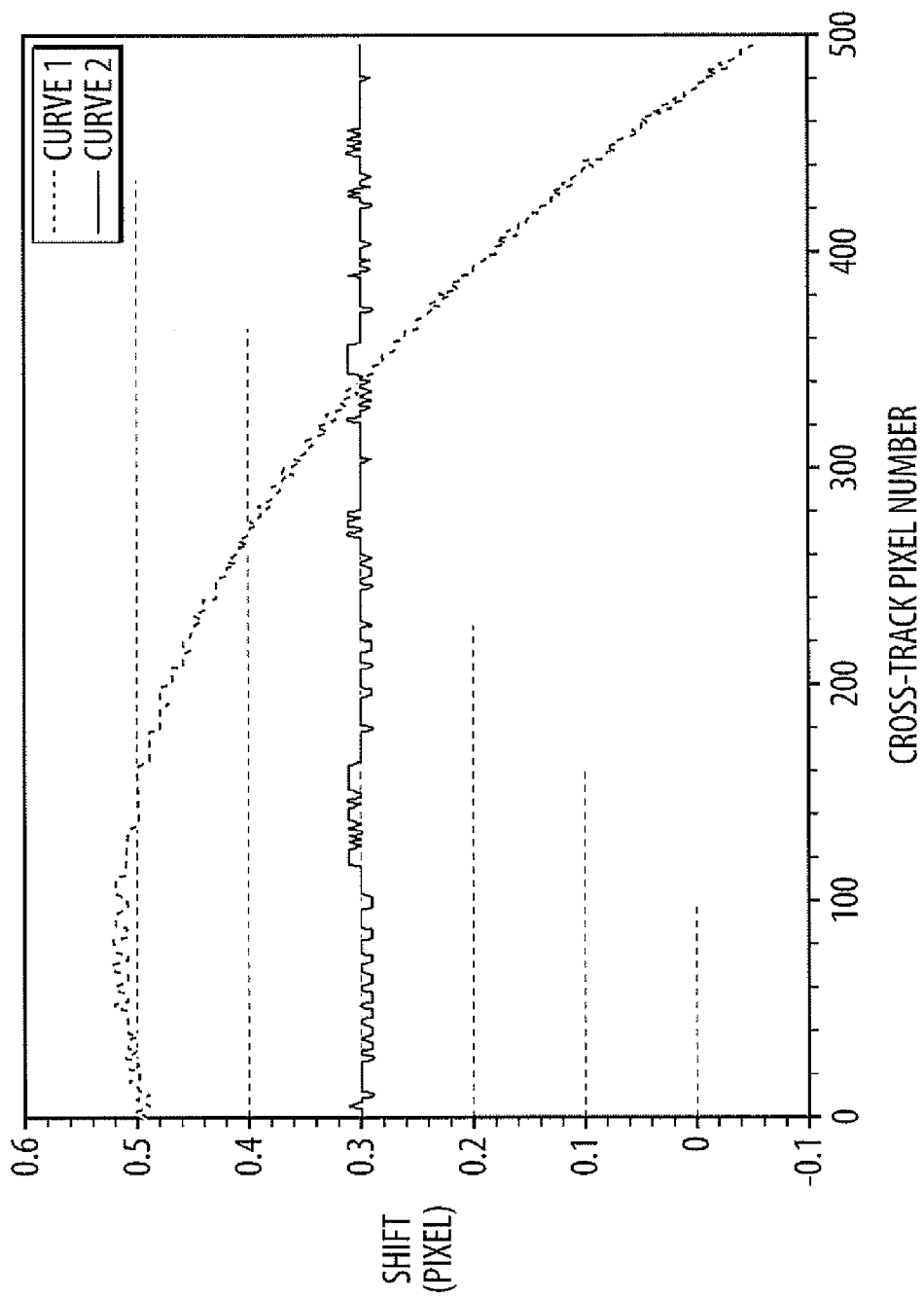
FIG. 5 is a graph showing pixel shift as a function of pixel location in cross-track direction.

FIG. 5 shows an example of pixel shifts between the baseline band image and an extracted band image (Curve 1). It can be seen from the figure that the spatial shifts between the two images are between −0.05 and 0.52 pixels. Pixel shift is shown as a function of pixel location in the cross-track direction. Curve 1 is the pixel shift between a baseline image and a selected band image. Curve 2 is the pixel shift between a baseline image and a derived image using Method 2 (described below) in exploiting the keystone characteristics.

The dynamic range of pixel intensities of the extracted images may be different, since the images are apart spectrally. The extracted images are normalized in order to reduce the impact of the intensity variations. In this disclosure, the mean and standard deviation of each of the extracted images are normalized to those of the baseline image. Assuming that the mean and standard deviation of the baseline image are $\mu_b$ and $\sigma_b$:

$$\mu_b = \frac{1}{NM} \sum_{j=1}^{N} \sum_{i=1}^{M} p_b(i, j), \quad (1)$$

$$\sigma_b = \frac{1}{NM} \sum_{j=1}^{N} \sum_{i=1}^{M} [p_b(i, j) - \mu_b]^2, \quad (2)$$

where $p_b(i,j)$ is the intensity of pixel (i, j) of the baseline image, M and N are the total number of columns and rows of the image. The mean of a selected image is $\mu_k$:

$$\mu_k = \frac{1}{NM} \sum_{j=1}^{N} \sum_{i=1}^{M} p_k(i, j), \quad (3)$$

where $p_k(i,j)$ is the intensity of pixel (i, j) of the selected image. First, the mean of the selected image is removed from the image:

$$p_{k-m}(i,j) = p_k(i,j) - \mu_k; \, i=1,2,3,\ldots,M; j=1,2,3\ldots,N. \quad (4)$$

Then the standard deviation of the selected image after mean removal is calculated:

$$\sigma_{k-m} = \frac{1}{NM} \sum_{j=1}^{N} \sum_{i=1}^{M} p_{k-m}(i, j)^2. \quad (5)$$

Finally, the image is normalized by multiplying $$\frac{\sigma_b}{\sigma_{k-m}}$$

and adding $\mu_b$:

$$p_{k-norm}(i, j) = p_{k-m}(i, j)\frac{\sigma_b}{\sigma_{k-m}} + \mu_b; \quad (6)$$

$$i = 1, 2, 3, \ldots, M;$$

$$j = 1, 2, 3, \ldots, N.$$

Method 1 is the simplest of the three methods described herein. In this method, all the sub-pixel shifted images to be used for increasing spatial resolution are the original band images. Thus, they need not be generated by processing. No additional storage memory is required in hardware implementation.

Method 2—Synthetic Images Derived Based on a Given Amount of Sub-Pixel Shift

A method of deriving synthetic images will now be described with reference to FIG. 6. In embodiments using Method 2, a band image 602 is first selected and extracted from a datacube 610 to be enhanced and is taken as the baseline image using the same criterion as Method 1 above. Each of three synthetic images 604, 606, 608 is then derived by picking up columns that have a predefined amount of pixel shift related to the baseline image 602, on a column-by-column basis, from the band images of the datacube. The predefined amount of sub-pixel shift is close to the ideal sub-pixel shift of a specific factor of spatial resolution enhancement. A synthetic image is composed of the columns that are extracted from different band images and have the same predefined amount of pixel shift related to the baseline image. Curve 2 in FIG. 5 shows pixel shifts between a derived image and the baseline image with a predefined pixel shift of 0.3. It can be seen that the pixel shifts are close to the predefined value of 0.3.

Figure 6:
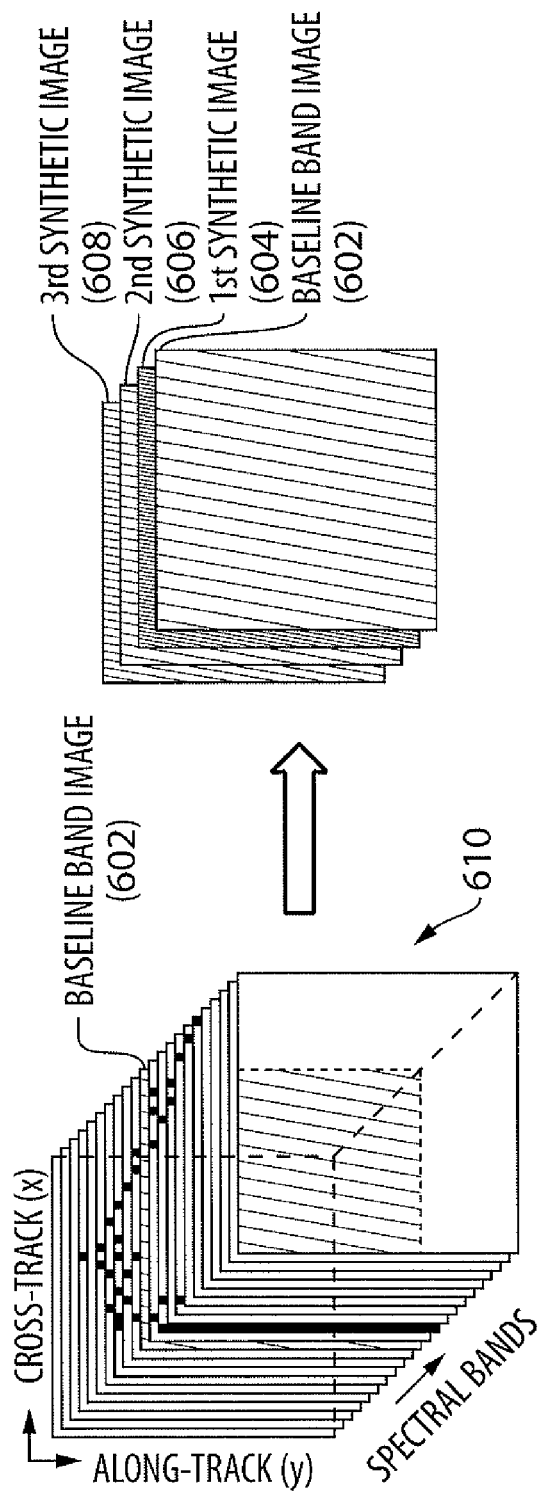
FIG. 6 illustrates a baseline image and three synthetic images derived by picking up columns from different band images based on a given amount of pixel shift.

FIG. 6 depicts a baseline image and three synthetic images derived by picking up columns from different band images based on a given amount pixel shift (in the figure only the selected columns for the 1$^{st}$ synthetic image are shown).

The dynamic range of a column of pixels that is picked up from a band image may be different from that of the same column of pixels of the baseline image, since these two columns of pixels are apart spectrally. The band images are thus normalized in order to reduce the impact of the intensity variations. In this disclosure, the mean and standard deviation of each of the extracted columns are normalized to those of the same column of the baseline image. Assuming that the mean and standard deviation of column i of the baseline image are $\mu_b^i$ and $\sigma_b^i$:

$$\mu_b^i = \frac{1}{N}\sum_{j=1}^{N} p_b(i, j), \quad (7)$$

$$\sigma_b^i = \frac{1}{N}\sum_{j=1}^{N} [p_b(i, j) - \mu_b^i]^2. \quad (8)$$

The mean of the picked up column i is $\mu_k^i$:

$$\mu_k^i = \frac{1}{N}\sum_{j=1}^{N} p_k(i, j), \quad (9)$$

where $p_k(i,j)$ is the intensity of a pixel located at (i, j) in the picked up column. First, the mean of the column is removed:

$$P_{k-m}^i(i,j) = p_k(i,j) - \mu_k^i; j=1,2,3,\ldots,N. \quad (10)$$

Then the standard deviation of the picked up column after mean removal is calculated:

$$\sigma_{k-m}^i = \frac{1}{N}\sum_{j=1}^{N} [p_{k-m}^i(i, j)]^2. \quad (11)$$

Finally, the N pixels of the picked up column i are normalized by multiplying $$\frac{\sigma_b^i}{\sigma_{k-m}^i}$$

and adding $\mu_b^i$:

$$p_{k-norm}^i(i, j) = p_{k-m}^i(i, j)\frac{\sigma_b^i}{\sigma_{k-m}^i} + \mu_b^i; \quad (12)$$

$$j = 1, 2, 3, \ldots, N.$$

The equations (7) to (12) will be calculated for each column i=1, 2, 3, ..., M.

Method 2 has the following advantages: The pixel shift of the pixels of a synthetic image related to the pixels at the same location of the baseline image is very close (e.g. around 0.3 pixels in Curve 2 in FIG. 5 instead of within a range from −0.05 to 0.52 pixels in Curve 1). The normalization of intensity is more accurate, as the synthetic image is normalized in column-by-column, instead of the normalization of an entire image as in Method 1.

Method 3—Synthetic Images Derived Based on Closeness of Pixel Intensity

Figure 7:
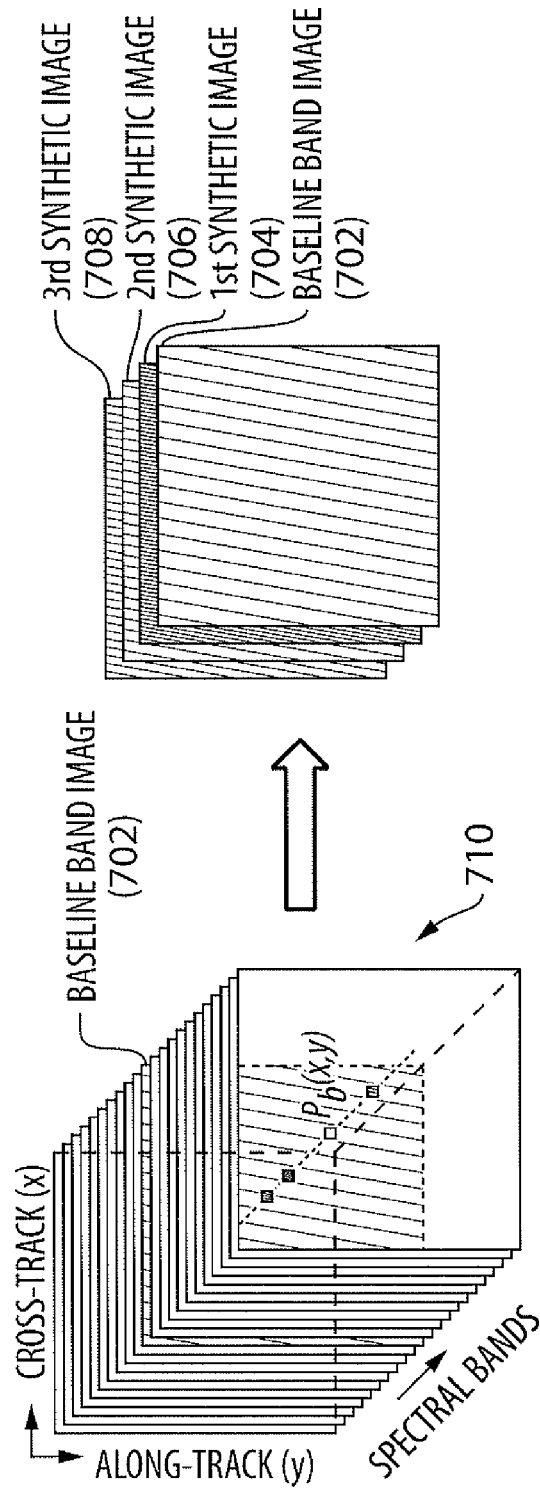
FIG. 7 illustrates a baseline image and three synthetic images derived by finding the pixel with closest intensity to each of the pixels of the baseline image across the spectral bands.

A third method of deriving band images will now be described with reference to FIG. 7. In embodiments using Method 3, a band image 702 is first selected and extracted from a datacube 710 to be enhanced and is taken as the baseline image using the same criterion as Method 1 above. Three synthetic images 704, 706, 708 are then derived by looking for the closest intensity to pixel $p_b(x,y)$, (x= 1, 2, 3, ..., M; y=1, 2, 3, ..., N) of the baseline image in all the spectral bands. The 1$^{st}$ synthetic image 702 is composed by the pixels found across spectral bands that have the closest intensity to the pixels at the same location in the baseline image. The 2$^{nd}$ synthetic image 704 is composed by the pixels found across spectral bands that have the 2$^{nd}$ closest intensity to the pixels at the same location in the baseline image. The 3$^{rd}$ synthetic image 708 is composed by the pixels that have the 3$^{rd}$ closest intensity to the pixels at the same location in the baseline image. The intensities of the pixels in the three synthetic images derived in this way are close to those of the baseline image. Thus, their dynamic range of pixel intensities does not need to be adjusted, i.e. no normalization is required. This may reduce the impact of intensity normalization on the quality of the enhancement of spatial resolution. Pixel shifts between a synthetic image and the baseline image vary in both cross-track and along-track directions.

Figure 8:
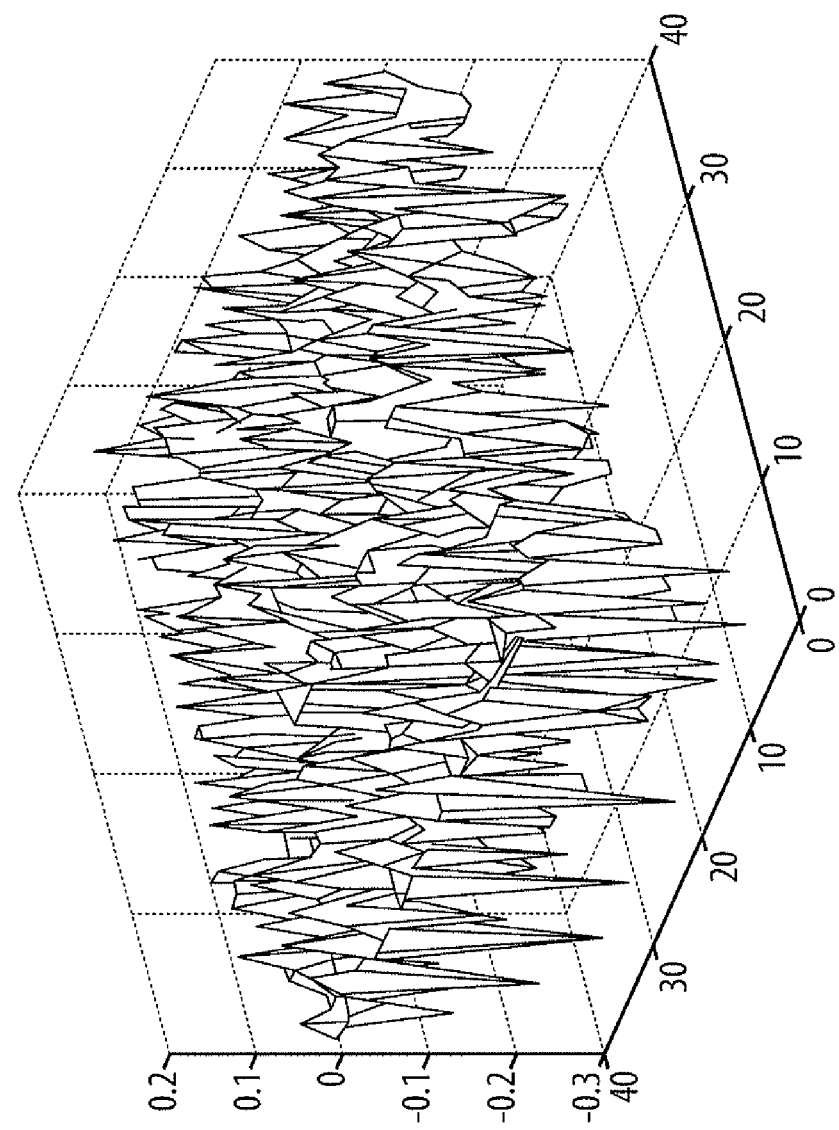
FIG. 8 illustrates a plane of pixel shift between the baseline image and a synthetic image based on the closeness of pixel intensity.

FIG. 8 shows the plane of pixel shifts between a synthetic image and the baseline image as a function of 2-dimensional spatial locations. The amount of spatial shift of the pixels varies as a function of pixel location in both cross-track and along-track directions.

Two Schemes of Organizing Sub-Pixel Shifted Images and IBP Implementation

Figure 10:
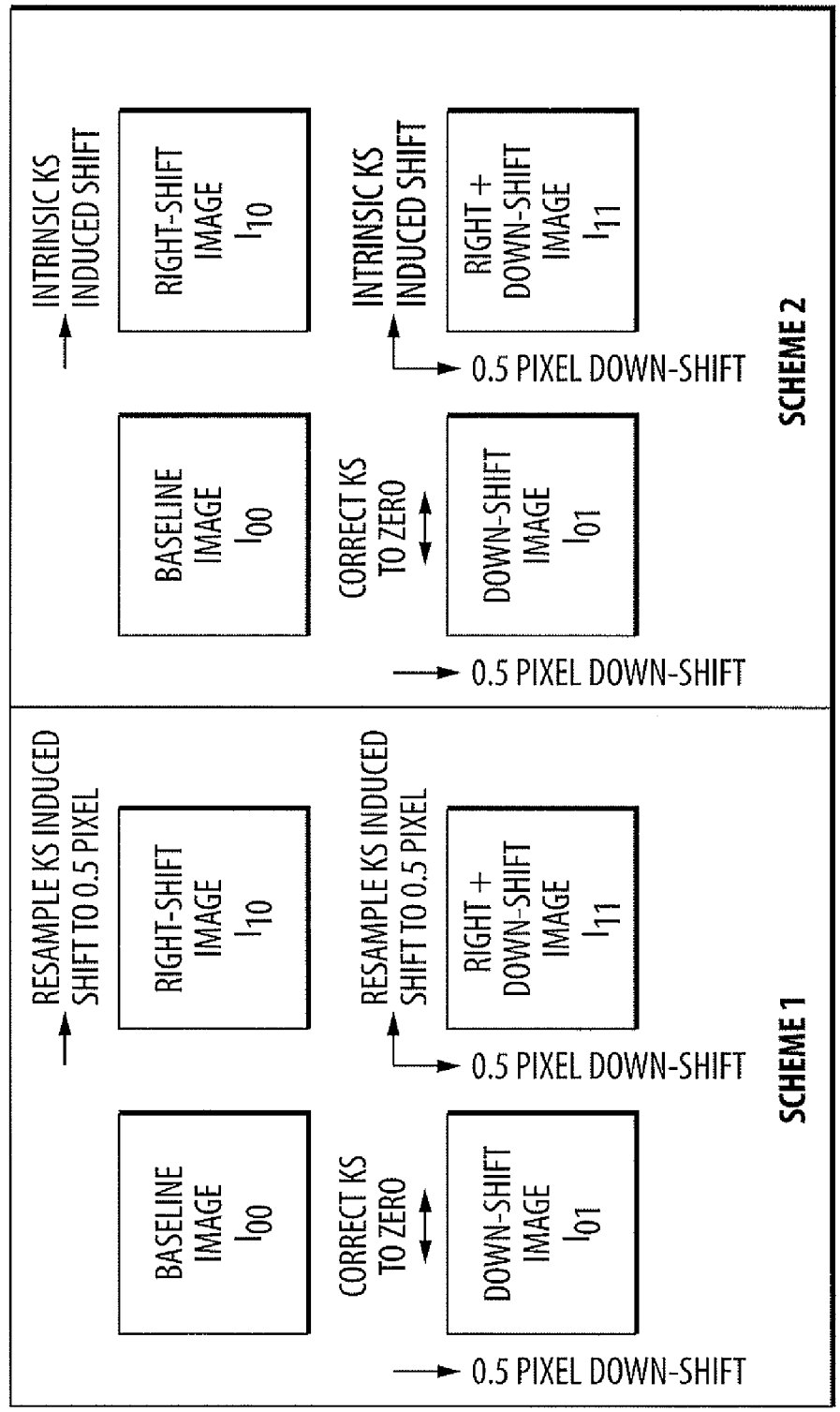
FIG. 10 illustrates two schemes of organizing the derived sub-pixel shifted images into $I_{00}$, $I_{10}$, $I_{01}$ and $I_{11}$ to be input to IBP for high spatial resolution.

For the methods described herein to achieve a factor of n×m=2×2 increase of spatial resolution, IBP ideally requires four images of the same scene having a ½-pixel step shift in both two dimensions as shown in FIG. 9. In this disclosure, the four sub-pixel shifted images derived using the three methods described above do not fully meet with this requirement. It is known that the spatial shift between the band images of a hyperspectral datacube induced by KS is only in the cross-track direction. It is debatable that there may be an amount of spatial shift in the along-track direction due to rotational misalignment caused by inaccurate opto-mechanical alignment of the instrument. The spatial shifts of the pixels in an image derived using the three methods above in cross-track direction related to the baseline image are variable and not always equal to ½-pixel. Two schemes are proposed to organize the four derived LR images before being input to IBP for creating the HR image. The organized image array is shown as $I_{00}$, $I_{10}$, $I_{01}$ and $I_{11}$. The two schemes are depicted in FIG. 10.

In Scheme 1, the baseline image is taken as $I_{00}$. The KS induced pixel shifts in one of the images derived using one of the methods described above are uniformly resampled to ½-pixel right shift. This resampled image is taken as $I_{10}$. Another derived image is corrected to zero KS shift related to the baseline image to align it with the baseline image in cross-track direction. Then this KS corrected image is shifted ½-pixel down (along-track) and is taken as $I_{01}$. $I_{11}$ is assigned by resampling the third derived image to ½-pixel both right and down shift related to the baseline image.

In a case of increase spatial resolution with a non 1:1 aspect ratio, for example, with an aspect ratio of 3:2, n×m=3×2=6 sub-pixel shifted images are derived using any of the three methods described above. The step shift in x direction is equal to ⅓-pixel and the step shift in y direction is equal to ½-pixel. For the 3 images in the 1$^{st}$ line of the organized image array as shown in FIG. 10, the baseline image is used as $I_{00}$ (leftmost in the line). The KS induced pixel shifts in one of the 5 remaining images are uniformly resampled to one step shift right (⅓-pixel right shift). This resampled image is taken as $I_{10}$. The KS induced pixel shifts in one of the 4 remaining images are uniformly resampled to two step shift right (⅔-pixel right shift). This resampled image is taken as $I_{20}$ (rightmost in the 1$^{st}$ line of the organized image array in FIG. 10 (not showed in the figure). The same process applies to the 3 remaining images for $I_{01}$, $I_{11}$, and $I_{21}$ in the 2$^{nd}$ line of the organized image array as in FIG. 10 with an exception of correcting the keystone shift of one image to zero for the leftmost image and shifting ½-pixel down (along-track) for each of the three images.

In scheme 2, the four derived images are organized in a similar manner as shown in Scheme 1, except that $I_{10}$ and $I_{11}$ are not resampled to the step shift (i.e. ½-pixel right shift). They remain the intrinsic KS pixel shifts related to the baseline image. In Scheme 2, due to the KS-induced pixel shifts not being uniformly resampled to the grid of multiple step shifts in x direction it is required to assign a derived image with large amount KS-induced pixel shift to the right side of the organized image array (i.e. an image with close to ½-pixel KS-induced shift as $I_{10}$ or $I_{11}$ for the increase factor of 2×2 and close to ⅔-pixel KS-induced shift as $I_{20}$ or $I_{21}$ for the increase factor of 3×2) and assign a derived image with small amount KS-induced pixel shift to the left side of the organized image array (i.e. close to 0 KS-induced shift as $I_{01}$). For example, with a spatial resolution increase factor of 3×2, it is preferable to assign a derived image with close to ⅓-pixel KS-induced shift as $I_{10}$ or $I_{11}$, and to assign a derived image with close to ⅔-pixel KS-induced shift as $I_{20}$ or $I_{21}$.

IBP

IBP consists of two steps—projection and back-projection. These two steps are performed iteratively until satisfactory results are obtained. The HR image is approximated using an initial estimation HR image $f^{(0)}$ and the imaging process is simulated using a blurring function $h_k$ and down-sampling operator $\downarrow s$ to generate a set of LR images $\{g_k^{(0)}\}$. If $f^{(0)}$ is equal to the real HR image (which is unknown), then the simulated LR images $\{g_k^{(0)}\}$ should be identical to the observed images $\{g_k\}$. Otherwise the initial estimation HR image $f^{(0)}$ is updated using the difference images $\{g_k - g_k^{(0)}\}$ to generate an improved HR image $f^{(1)}$. This process is repeated until the minimum error between the simulated LR images and observed images is reached:

$$e^{(n)} = \left[ \frac{1}{K} \sum_{k=1}^{K} (g_k - g_k^{(n)})^2 \right]^{1/2}, \quad (13)$$

where $g_k^{(n)}$ is the simulated LR image k in the n-th iteration, K is the total number of the LR images. The simulated LR images $\{g_k^{(n)}\}$ are obtained by:

$$g_k^{(n)} = (T_k(f^{(n)}) * h_k) \downarrow s, \quad (14)$$

where $T_k$ is a 2-D geometric transformation from f to $g_k$, * is the convolution operator, and $\downarrow s$ denotes a down-sampling operator by a factor of s. The update of the HR image is given by:

$$f^{(n+1)} = f^{(n)} + \frac{1}{K} \sum_{k=1}^{K} T_k^{-1} \{[(g_k - g_k^{(n)}) \uparrow s] * p\}, \quad (15)$$

where $\uparrow s$ is an up-sampling operator by a factor of s and p is a back-project kernel, which is determined by $h_k$ and $T_k$.

In the projection step, in the first iteration, the four derived images $I_{00}$, $I_{10}$, $I_{01}$ and $I_{11}$ are used as the initial input to back-projection. In other iterations, an estimation HR image $f^{(n)}$ has already been generated. It is used to form four simulated LR images. First, three shifted HR images are generated by shifting the estimation HR image by one pixel in cross-track direction, one pixel in along-track direction and one pixel in the both directions. Together with the estimation HR image now there are a total of four HR images. The four simulated LR images are then formed by down-sampling the four HR images, i.e. every 2×2 pixels in each of the four HR images are averaged and taken as a pixel of the simulated LR image. In back-projection step, the difference images between the four simulated LR images and the four initial input images are first up-sampled by expanding them into the same spatial resolution as the HR image. This is normally done by using zero-order linear interpolation or bilinear interpolation. Then the difference images are de-shifted. The improved HR image $f^{(n+1)}$ is obtained by combining all corresponding pixels of the LR images in terms of equation (15). In this disclosure, the iteration number is set to 10. This achieves a satisfactory image quality. However, it is to be understood that any number of iterations is possible. The number of iterations can be selected based on the image quality desired.

Image Quality Metric—Modified Visual Information Fidelity

Before reporting the experimental results of a single band HR image produced using the methodology described above, an image quality metric to measure the HR image quantitatively will be defined. The simplest and most widely used quality metric is peak signal-to-noise ratio (PSNR) that is based on the mean squared error (MSE) computed by averaging the squared intensity differences between the distorted and the reference image pixels. But PSNR is not well matched to perceived visual quality, as disclosed in B. Girod, "What's wrong with mean-squared error," in *Digital Images and Human Vision*, A. B. Watson, Ed. Cambridge, Mass.: MIT Press, pp. 207-220, 1993. Two distorted images with the same PSNR may have very different types of errors, some of which are much more visible than others. Thus one image may look very much similar to the reference, whereas another may look very much distorted (Z. Wang, A. C. Bovik, H. R. Sheikh and E. P. Simoncelli, "Image Quality Assessment: From Error Visibility to Structural Similarity" IEEE Trans, on Image Processing, vol. 13, no. 4, pp. 600-612, April 2004). Sheikh and Bovik developed methods to measure image information based on the human visual system models (R. H. Sheikh and A. C. Bovik, "Image Information and Visual Quality" IEEE Trans. on Image Processing, vol. 15, no. 2, pp 430-444, February 2006). They proposed to assess visual quality of a test image in terms of the amount of image information that a human brain could extract from the test image related to the amount of information that the human brain could extract from the reference image. They defined the ratio of the test image information to the reference image information as visual information fidelity (VIF):

$$VIF = \frac{\sum_{j \in subbands} I(\vec{C}^{N,j}; \vec{F}^{N,j} | s^{N,j})}{\sum_{j \in subbands} I(\vec{C}^{N,j}; \vec{E}^{N,j} | s^{N,j})}, \quad (16)$$

where $I(\vec{C}^{N,j}; \vec{E}^{N,j}|s^{N,j})$ and $I(\vec{C}^{N,j}; \vec{F}^{N,j}|s^{N,j})$ represent the information volume that could be ideally extracted by the brain from a particular wavelet subband in the test image and in the reference respectively. For all practical distortion types, VIF lies in the interval [0, 1]. In the case where the image is not distorted at all and VIF is calculated between the reference image and its copy, VIF is exactly unity. If the information volume of a test image is larger than that of the reference image, the VIF value is larger than unity. This is a distinct feature of VIF over traditional image quality assessment methods.

VIF requires the test image and the reference image to have the same size. In this disclosure the image sizes of the spatial resolution enhanced image and the original image are not the same. VIF equation (16) can be slightly modified to:

$$MVIF = \frac{\sum_{j \in subbands} I(\vec{C}^{N,j}; \vec{F}^{N,j} | s^{N,j})}{f_{size} \times \sum_{j \in subbands} I(\vec{C}^{N,j}; \vec{E}^{N,j} | s^{N,j})}, \quad (17)$$

when the sizes of the test image and the reference image are not the same and have a factor of size of $f_{size}$. This VIF is referred to as modified VIF (MVIF) in this disclosure.

Experimental Results of Single Band HR Image

Test Datacubes

Figure 11A:
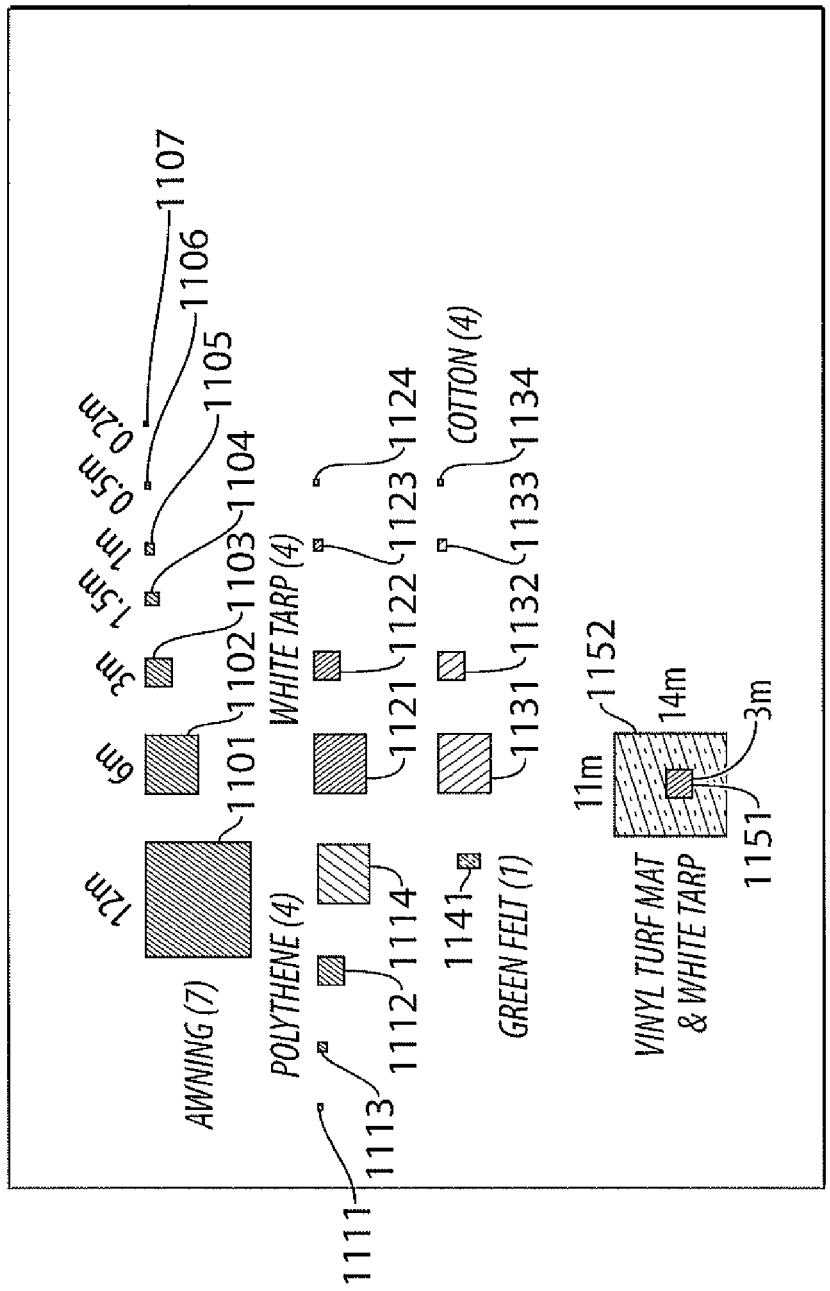
FIG. 11(*a*) illustrates a layout of man-made targets of a testing datacube.
Figure 11B:
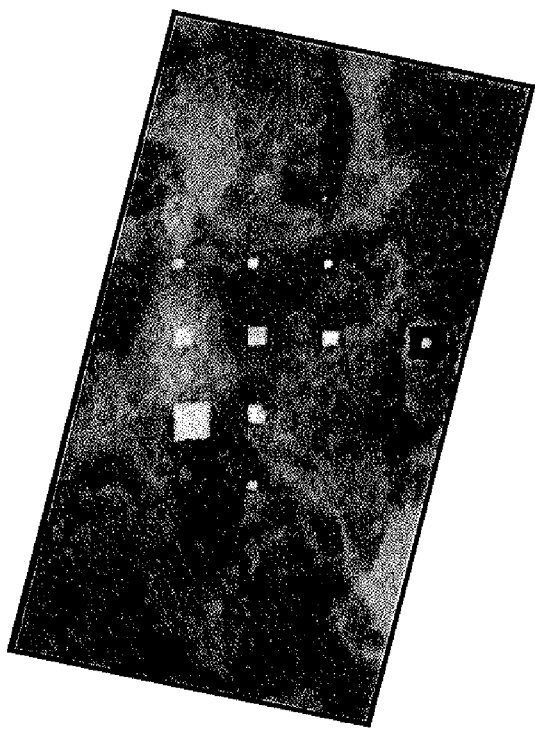

Two datacubes acquired using the airborne SFSI sensor were tested. The first test datacube was collected for studying target detection from short wave infrared hyperspectral imagery with 240 bands covering a spectral range between 1224 nm and 2427 nm with a band centre spacing of 5.2 nm. The GSD is 2.20 m×1.85 m. The size of the datacube is 140 lines by 496 pixels by 240 bands. Man-made targets with different materials and sizes were deployed in a mixture of sand and low-density grass cover within the scene of the datacube. Seven pieces of awnings 1101, 1102, 1103, 1104, 1105, 1106, 1107 with varying sizes ranging from 12 m×12 m to 0.2 m×0.2 m, four pieces of polythene 1111, 1112, 1113 and 1114, four pieces of white tarp 1121, 1122, 1123, 1124 and four pieces of white cotton 1131, 1132, 1133, 1134 with varying size ranging from 6 m×6 m to 0.5 m×0.5 m were deployed. A green felt 1141 of size 2 m×2 m was deployed. In addition, a 3 m×3 m piece of white tarp 1151 was placed on a large vinyl turf mat 1152 of size 11 m×14 m. FIG. 11a shows the layout of the man-made targets and FIG. 11(b) shows the disposition of the targets on the ground viewed by the IKONOS satellite in the panchromatic scene with 1 m resolution. This test datacube is referred to as "Target datacube" in this disclosure.

The second testing datacube was collected over Key Lake in northern Saskatchewan, Canada for studying the capability of imaging spectrometers in identifying a uranium mine and associated activities. The datacube was acquired with the same spectral range and interval as the Target datacube but with a different GSD of 3.19 m×3.13 m. The size of the datacube is 1090 lines by 496 pixels by 240 bands. The uranium mine site located at Key Lake is one of several in the Athabasca sandstone formation. Key Lake is no longer functioning as a mine. Now the facilities at Key Lake process high grade uranium ore trucked in from a mine at a distance of 80 km. The scene of the testing datacube includes a mill complex and a mine complex.

Results of Target Datacube

Figure 12A:
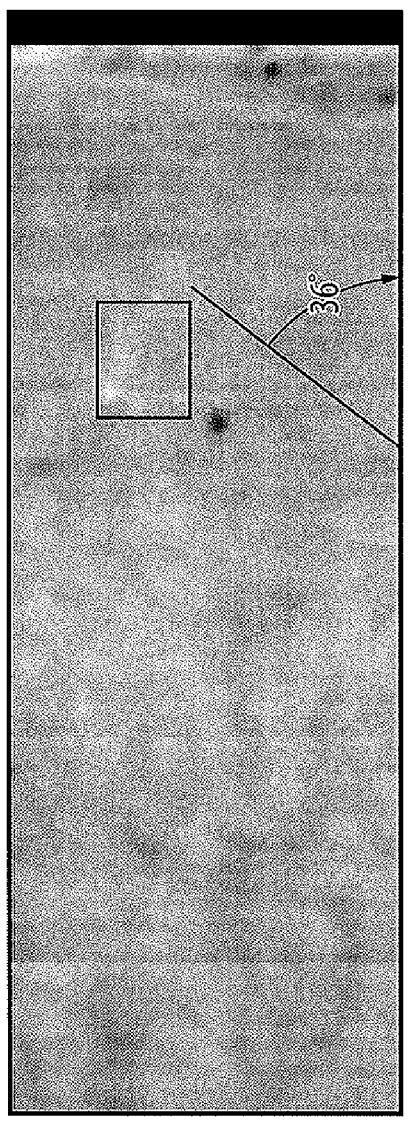
FIGS. 12(*a*) to 12(*d*) show results of high resolution (HR) images of a man-made target datacube.

Due to the Target datacube acquired by the SFSI sensor being in the short wave infrared region, it is hard to identify the targets in the scene of the datacube by human eyes. The man-made targets of size equal to or larger than 6 m×6 m barely showed up in the band images between 1289 nm and 1364 nm (from bands 13 to 28) as a result of the fact that GSD of the datacube is 2.20 m×1.85 m and there is a rotational angle of approximately 36° between the target array and the cross-track line. FIG. 12(a) shows the image of band 13 after linear contrast enhancement. According to the target layout information in FIGS. 11(a) and 11(b), the targets of 12 m×12 m and 6 m×6 m awning, 6 m×6 m white tarp, 6 m×6 m polythene and 6 m×6 m cotton are barely identifiable within the rectangular window. The 11 m×14 m vinyl turf mat showed up in dark. In order to emphasize these targets the image of band 13 is displayed in FIG. 12(b) after using ENVI software tool's interactive linear histogram stretching and median filtering. It can be seen from the zoomed image that these targets are blurred out and connected to each other (except the 6 m×6 m white tarp).

Figure 12B:
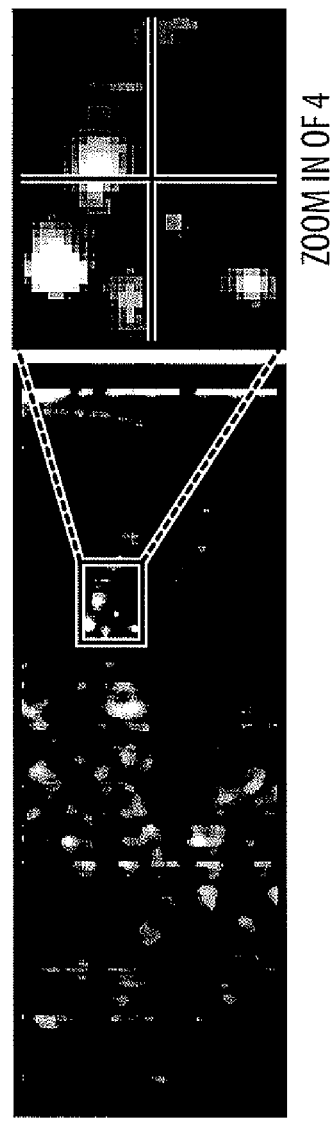
Figure 12C:
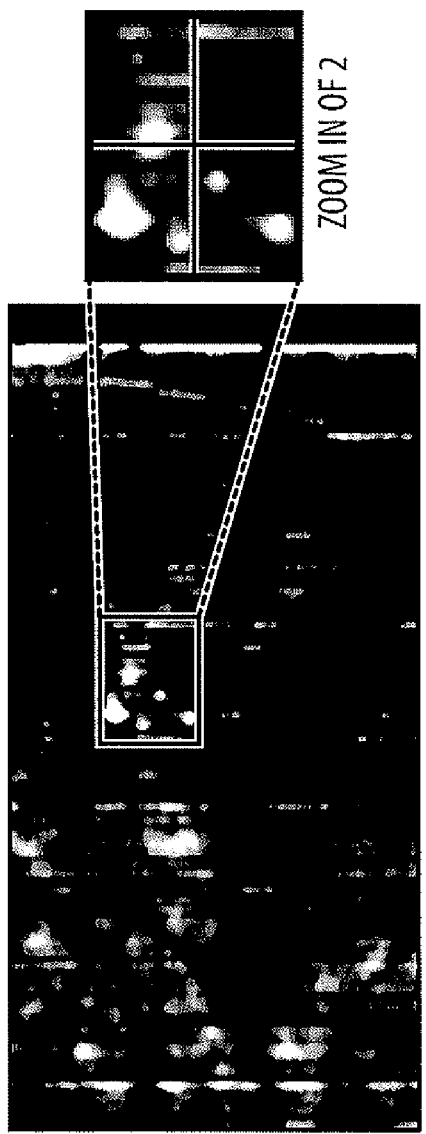

FIG. 12(c) shows the HR image produced using the bicubic interpolation on the image of band 13 with the same interactive linear histogram stretching and median filtering as in FIG. 12(b). From the zoomed image it can be seen that the targets are still blurred out and connected to each other. The only improvement is that the pixels become finer thanks to the interpolation. The MVIF of the interpolated HR image is 0.92 listed in Table 1. This MVIF value indicates that this HR image produced using the interpolation does not contain more information than the original image on which it is based.

Three tests, demonstrating separate working examples of the methods disclosed herein, were conducted.

Test #1

In one test according to Method 1, four images were extracted from bands 13, 18, 23 and 28 of the Target datacube with band 13 being taken as the baseline image according to Method 1 described above. These bands were selected because the man-made targets barely showed up only in the images between band 13 and 28. The pixel shifts induced by KS among these band images are relatively small and vary in a range 0~0.38 pixels. These four images then were arranged using two organizing schemes before being input to IBP algorithm. The IBP algorithm produced two HR images with a factor of 2×2 after a predefined 10 iterations. Listed in Table 1 (below), the MVIF of the HR image with image organizing Scheme 1 is 0.99, while the MVIF of the HR image with image organizing Scheme 2 is 1.03. The MVIF greater than 1.0 indicates that after increase of spatial resolution, the HR image contains more information than the original image.

Figure 12D:
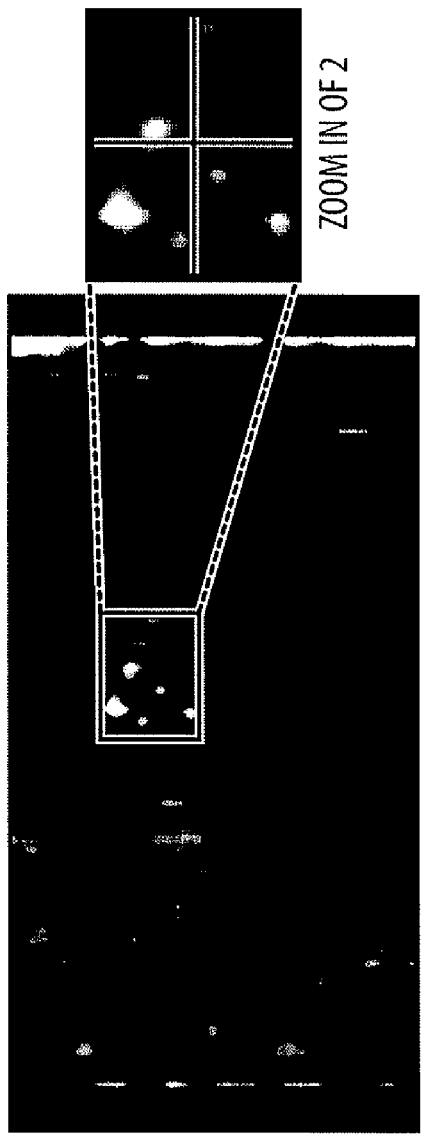

FIG. 12(d) shows the HR image using image organizing Scheme 2 with the same display condition as FIGS. 12(b) and (c). It is observed from the HR image that the targets are distinct and well separated. The 12 m×12 m awning target even approximately outlines a square shape with one edge aligning with the direction of the target array as illustrated in FIG. 12(a). The total number of pixels in the bright area was counted. It is equal to 148 pixels. Using this number of pixels, the area of the target can be estimated as following:

$$\text{Total\# of pixels} \times \frac{\text{Area per ground pixel}}{f_{size}} =$$

$$148 \times \frac{2.20 \text{ m} \times 1.85 \text{ m}}{2 \times 2} = 150.6 \text{ m}^2.$$

This value is reasonably close to the real target area of 12 m×12 m=144 m². The four 6 m×6 m targets of awning, white tarp, polythene and cotton are relatively close to their real target areas except the 6 m×6 m awning target that spreads out with lower intensity. It is also observed that small awning targets (1.5 m×1.5 m and 1 m×1 m) in the HR image are better distinguishable in the cross-track direction than in the original image. This is expected as the additional spatial information induced by KS shift is mainly in the cross-track direction. It is also noticed that the green felt can be barely seen in the HR image. This target cannot be seen in either the original image or the interpolated image.

Test #2

In a second test, with band 13 as the baseline image, three synthetic images with a KS-induced shift close to 0.1, 0.3 and 0.4 pixels related to the baseline image were derived using Method 2 described above. The columns that compose the synthetic images were picked up from the band images across all the spectral bands. After arrangement of the four images using the two organizing schemes, two HR images were produced using IBP algorithm. In organizing the synthetic images using Scheme 2, the synthetic image with 0.4 pixels KS-induced shift was assigned as $I_{10}$. The synthetic image with 0.3 pixels KS-induced shift was used for forming $I_{11}$, and the synthetic image with 0.1 pixels KS-induced shift was used for forming $I_{01}$. The MVIFs of the two HR images are 1.04 and 1.08 corresponding to the two organizing schemes. The MVIFs of these two HR images are greater than those of the two HR images produced using the four band images (Method 1). One possible explanation for this is that the KS-induced shifts among the synthetic images are not constrained within a small number of bands and thus are relatively larger. These two HR images are not shown, since they are similar to the HR image in FIGS. 12(a) to 12(d).

Test #3

In a third test, three synthetic images were derived by finding the $1^{st}$, $2^{nd}$ and $3^{rd}$ closest intensity of each pixel at the same location of the baseline image band 13 according to Method 3 described above. KS-induced shift of each pixel between the baseline image and each of the synthetic images varies as a function of pixel location in the two spatial directions (i.e. cross-track and along-track). The shift between the pixels of the baseline image and each of the three synthetic images covers a range from −0.63 to 0.58 pixels. The MVIFs of two HR images produced using these synthetic images are 1.09 and 1.12 corresponding to the two organizing schemes. These MVIFs are better than those of the HR images using the other two image deriving methods. This is probably attributed to the relatively closer intensities of the pixels in the baseline image and in the synthetic images and the fact that there is no intensity normalization undertaken among the images.

It is also noticed that the MVIFs of the HR images produced using image organizing Scheme 2 are slightly better than those using image organizing Scheme 1. This is probably caused by the additional error introduced in resampling the KS-induced shifts to a uniform ½-pixel in Scheme 1.

TABLE 1

Modified VIF of the HR images produced from the Target datacube using the proposed methods and two organizing schemes (baseline image: band 13).

| | Modified VIF | |
|---|---|---|
| Method for derived images | Scheme 1 | Scheme 2 |
| Interpolation of baseline image | 0.92 | |
| Method 1 - Four band images extracted from the datacube | 0.99 | 1.03 |
| Method 2 - Synthetic images derived based on a given sub-pixel shift | 1.04 | 1.08 |
| Method 3 - Synthetic images derived based on closeness of pixel intensity | 1.09 | 1.12 |

Results of Key Lake Datacube

Table 2 lists the MVIF of the HR images produced for the Key Lake datacube. After viewing the datacube, it was observed that there are two spectral regions: 1279 nm-1369 nm (bands 11-29) and 1539 nm-1714 nm (bands 62-98), where spectrum intensities are relatively higher and flatter. Band image at 1549 nm (band 65) was taken as the baseline image for the HR images using Method 1 and 2 (to differentiate spectral region in Test 1 and Test 2 above), and band image at 1304 nm (band 16) (to differentiate from band 13 as the baseline image in Test 3 above) was taken as the baseline image for the HR images using Method 3. The MVIFs of the HR images produced using interpolation of single band images 65 and 16 are 0.95 and 0.93 respectively.

Four band images were extracted from bands 65, 72, 84 and 96 of the Key Lake datacube using Method 1. These band images were selected because they locate in a spectral region with relatively higher and flatter amplitude. The range of KS-induced pixel shift is 0~4.58 pixels among these images. The MVIF of the HR images produced using Method 1 with the two organizing schemes are 1.00 and 1.03.

Three synthetic images with a KS-induced shift close to 0.2, 0.3 and 0.4 pixels related to the baseline image (band 65) were derived using Method 2. In organizing the synthetic images using Scheme 2, the synthetic image with 0.4 pixels shift was assigned as $I_{10}$. The synthetic image with 0.3 pixels shift was used for forming $I_{11}$, and the synthetic image with 0.2 pixels shift was used for forming $I_{01}$. The MVIF of the HR images produced using Method 2 with the two organizing schemes are 1.01 and 1.04.

With band 16 as the baseline image, three synthetic images were derived using Method 3. The KS-induced shift between the pixels of the baseline image and each of the three synthetic images covers a range from −0.54 to 0.55 pixels. The MVIFs of two HR images produced using these synthetic images are 1.03 and 1.06 corresponding to the two organizing schemes. Similar as for the Target datacube, the MVIFs produced using Method 3 are still better than those of the HR images using the other two methods. The MVIFs of the HR images produced using organizing Scheme 2 are also slightly better than those using organizing Scheme 1.

TABLE 2

Modified VIF of the HR images produced from Key Lake datacube using the proposed methods and two organizing schemes.

| Method for derived images | Modified VIF | |
|---|---|---|
| | Scheme 1 | Scheme 2 |
| Interpolation of baseline image (band 65) | 0.95 | |
| Method 1 - Four band images extracted from the datacube (baseline image: band 65) | 1.00 | 1.03 |
| Method 2 - Synthetic images derived based on a given sub-pixel shift (baseline image: band 65) | 1.01 | 1.04 |
| Interpolation of baseline image (band 16) | 0.93 | |
| Method 3 - Synthetic images derived based on closeness of pixel intensity (baseline image: band 16) | 1.03 | 1.06 |

Figure 13A:
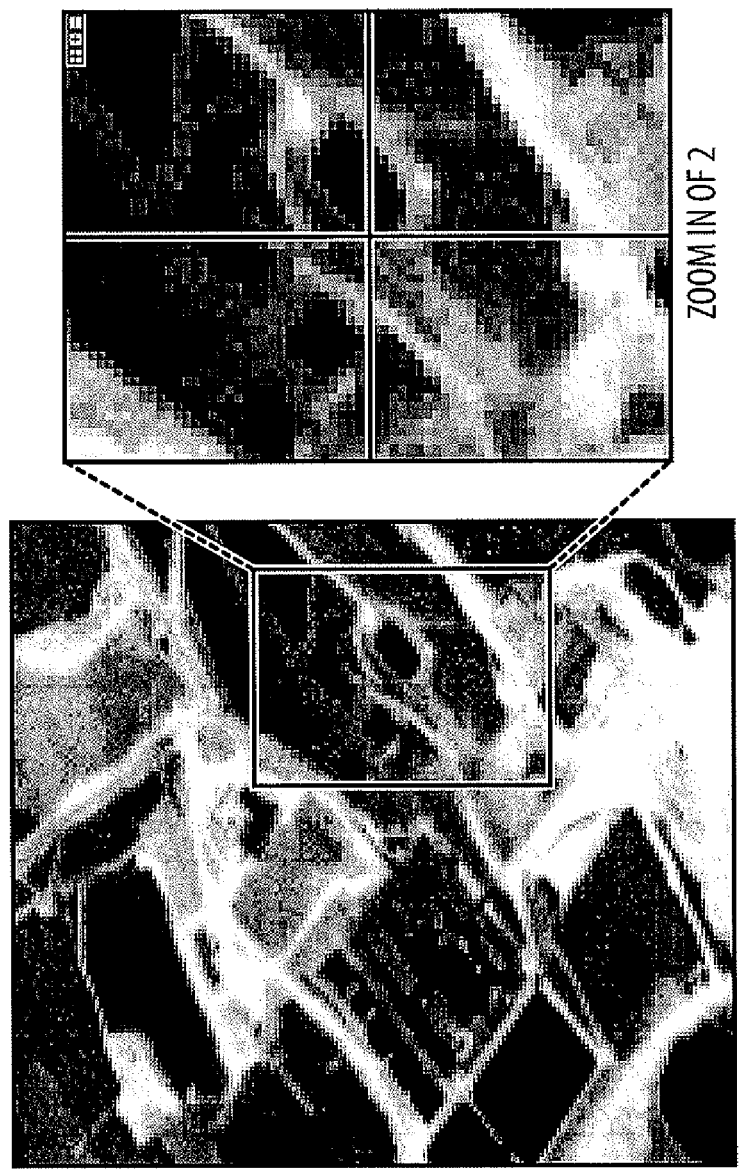
FIGS. 13(*a*) and 13(*b*) show results of HR images of a Key Lake datacube.
Figure 13B:
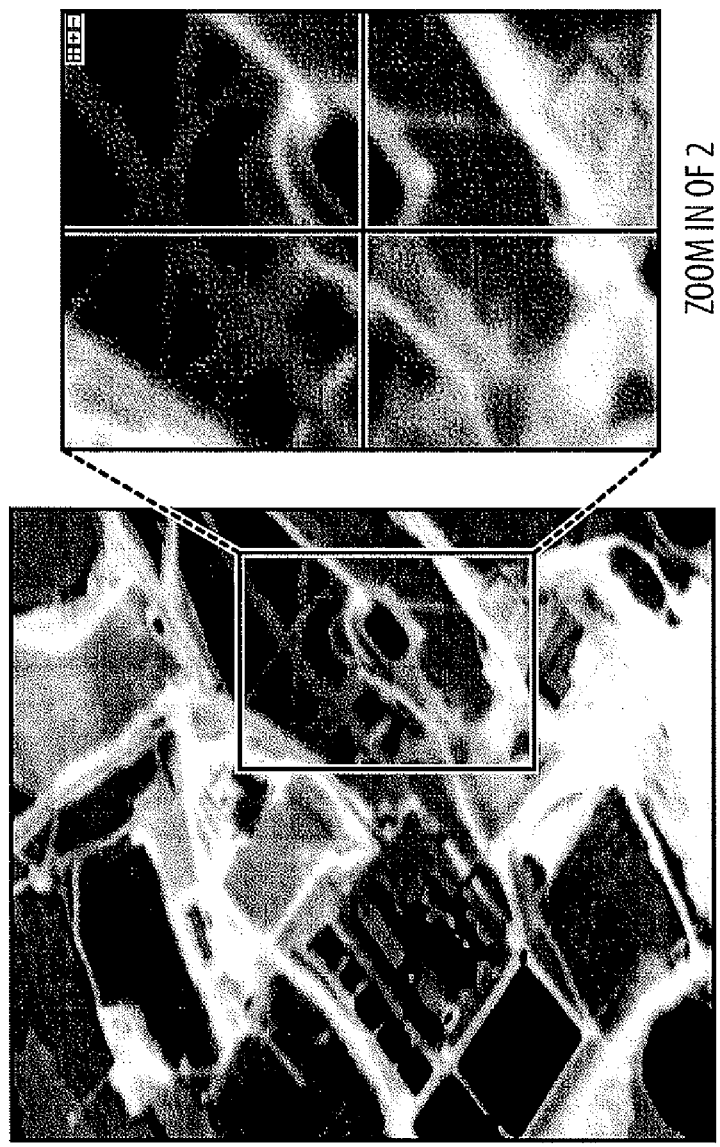

FIG. 13(a) shows the original Key Lake image at 1304 nm (band 16) and FIG. 13(b) shows the HR image produced using Method 3 with image organizing Scheme 2 after contrast enhancement using ENVI software tool's histogram equalization. In the mill complex located in centre left of the scene there are 5 square-shape monitoring ponds, two reservoirs (only a half of the small one is shown), processing facilities and buildings. These objects are all displayed in dark due to the instrument wavelength range being in the SWIR region. It is observed that these objects in the HR image are more distinct. The edges of the objects are finer in the HR image than in the original image. A small region-of-interest (ROI) is selected (marked by a box) and zoomed-in with a factor of 2×2 to show the details. It can be seen that the intersection of the three roads is better separated in the HR image than in the original image. A small triangle outlined by the roads, which cannot be seen in the original image, can be better seen in HR image. The edge of the reservoir located in the centre of the ROI is smoother in the HR image than in the original image. At the lower right corner of the ROI there is a mining laydown area that cannot be well identified in the original image. The outline and three rows of the lay-down area can be better identified in the HR image.

Increase Spatial Resolution of an Entire Datacube

This section deals with how to enhance spatial resolution of an entire hyperspectral datacube using the HR image obtained by exploiting the keystone based information of the datacube. Throughout this disclosure reference to an "entire" datacube includes substantially all of the images of a datacube. In some cases it is necessary to discard a number of bands from the datacube in implementing the methods. For example, band images with very poor signal energy (poor SNR or signal close to zero) are useless to users and are often discarded in processing or applications. After discarding useless bands, the enhancement of the spatial resolution of the remaining bands is still considered enhancing the spatial resolution of the entire datacube.

In this disclosure, the HR image is used as a panchromatic (Pan) image as in the case of the conventional spatial resolution enhancement of hyperspectral imageries. There is no need to geometrically register the HR image with each band image of the datacube, since the HR image is derived from the datacube.

Several approaches to enhancing spatial resolution of hyperspectral imagery have been reported. Most of them have heritage in the sharpening of multispectral imagery based on a higher resolution Pan image. These include but are not limited to component substitution, wavelet transform methods, least squares estimation (J. C. Price, "Combining panchromatic and multispectral imagery from dual resolution satellite instruments," Remote Sensing of Environment, vol. 21, pp. 119-128, 1987; and C. K. Munechika, J. S. Warnick, C. Salvagglo, and J. R. Schott, "Resolution enhancement of multispectral image data to improve classification accuracy," Photogrammetric Engineering & Remote Sensing, vol. 59, pp. 67-72, 1993.), statistical methods (R. Nishii, S. Kusanobu, and S. Tanaka, "Enhancement of low resolution image based on high resolution bands," IEEE Trans. Geoscience & Remote Sensing, vol. 34, no. 5, pp. 1151-1158, September 1996), linear mixing model (G. D. Robinson, H. N. Gross, and J. R. Schott, "Evaluation of two applications of spectral mixing models to image fusion," Remote Sensing of Environment, vol. 71, pp. 272-281, 2000; H. N. Gross and 3. R. Schott, "Application of spectral mixture analysis and image fusion techniques for image sharpening," Remote Sensing of Environment, vol. 63, pp. 85-94, 1998; M. E. Winter and E. M. Winter, "Physics-based resolution enhancement of hyperspectral data," Proc. SPIE, vol. 4725, pp. 580-587, 2002; and N. Keshava and J. F. Mustard, "Spectral unmixing," IEEE Signal Processing Magazine, vol. 19, no. 1, pp. 44-57, January 2002), and maximum a posteriori (MAP) estimation (R. C. Hardie and M. T. Eismann, "MAP estimation for hyperspectral image resolution enhancement using an auxiliary sensor," IEEE Trans. Image Processing, vol. 13, no. 9, pp. 1174-1184, September 2004; M. T. Eismann and R. C. Hardie, "Application of the stochastic mixing model to hyperspectral resolution enhancement," IEEE Trans. Geoscience & Remote Sensing, vol. 42, no. 9, pp. 1924-1933, September 2004; and Eismann, M. T., and R. C. Hardie, "Hyperspectral resolution enhancement using high-resolution multispectral imagery with arbitrary response functions," IEEE Trans. on Geoscience and Remote Sensing, vol. 43, No. 3, pp. 455-465, March 2005).

In this disclosure, a complex ridgelet transform (CRT) based method is utilized to fuse the single HR image to each band image of the datacube for increasing the spatial resolution of the entire datacube. The CRT method combines a ridgelet transform with a dual-tree complex wavelet transform. This method is proposed because the ridgelet transform is capable of well capturing the line and curve singularities within an image, whereas the wavelet transform is incapable of such capturing. A dual-tree complex wavelet transform has an approximate shift-invariant property, which is critical for image spatial resolution enhancement. The combination of these two transforms is referred to as the complex ridgelet transform and can take the advantages of both transforms.

Figure 14:
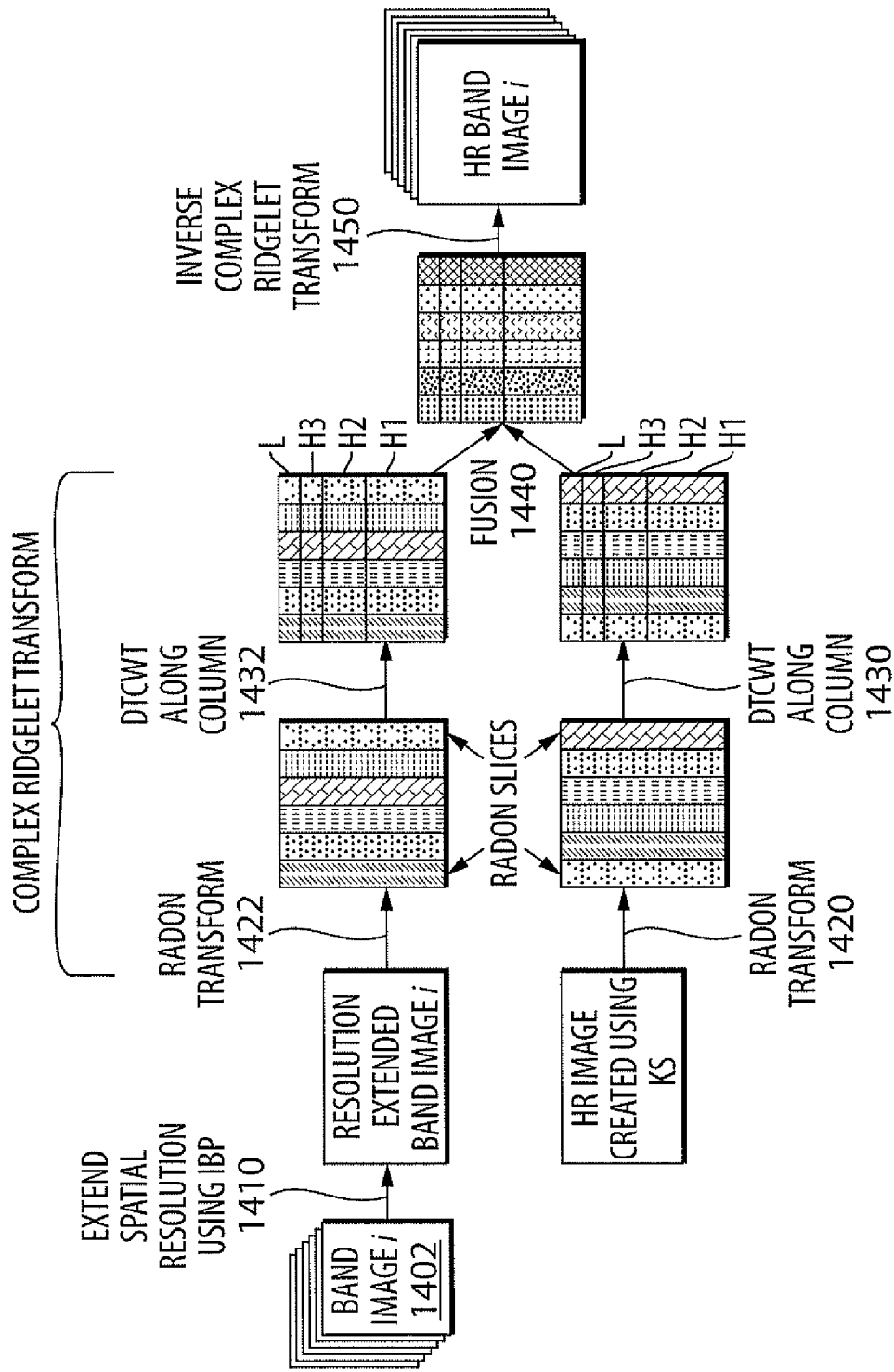
FIG. 14 is a flow chart of a complex ridgelet transform based method for enhancing spatial resolution of an entire hyperspectral datacube.

FIG. 14 shows a flow chart of the proposed CRT method. The IBP is used to extend the spatial resolution of each band image of the datacube to the same spatial resolution as the HR image 1410. For a band image, three shifted images are produced by shifting the band image one pixel in cross-track direction, one pixel in along-track direction, and one pixel in both cross-track and along-track directions. The band image and its three shifted images are used as inputs for the IBP algorithm to generate the spatial resolution extended image. The IBP iteration stops when a pre-defined difference error is reached or the maximum iteration number (e.g., 10) is reached, whatever which one comes first.

A Radon transform is first applied 1420, 1422 to the HR image and each of the spatial resolution-extended band images of the datacube to generate Radon slices for the images. A Radon slice is a set of Radon coefficients or a 1 D column. Then a 1D dual-tree complex wavelet transform (DTCWT) is applied 1430, 1432 to each of the Radon slices. In this way, the complex ridgelet coefficients have been finally generated for both the HR image and each of the band images of the datacube.

The complex ridgelet coefficients of the HR image are fused 1440 with those of each of the band images of the datacube according to the following rules:

$$C_{F,K}^L = C_{A,K}^L, \text{ for low frequency coefficients,} \quad (18)$$

$$C_{F,K}^H = \begin{cases} C_{A,K}^H & \text{if } |C_{A,K}^H| \geq |C_{B,K}^H| \\ C_{B,K}^H & \text{otherwise,} \end{cases} \text{ for high frequency coefficients,} \quad (19)$$

where A is the resolution-extended band image, B is the HR image, F is the resolution enhanced image, and K is the index of the complex ridgelet coefficients.

An inverse complex ridgelet transform is performed 1450 in order to generate the spatial resolution enhanced datacube. Experimental results show that the complex ridgelet transform based fusion method produces much better PSNR than the fusion methods using PCA (Principal Component Analysis), wavelet transform and ridgelet transform. In this disclosure, we use the complex ridgelet transform based method to enhance the spatial resolution of an entire datacube.

Figure 15:
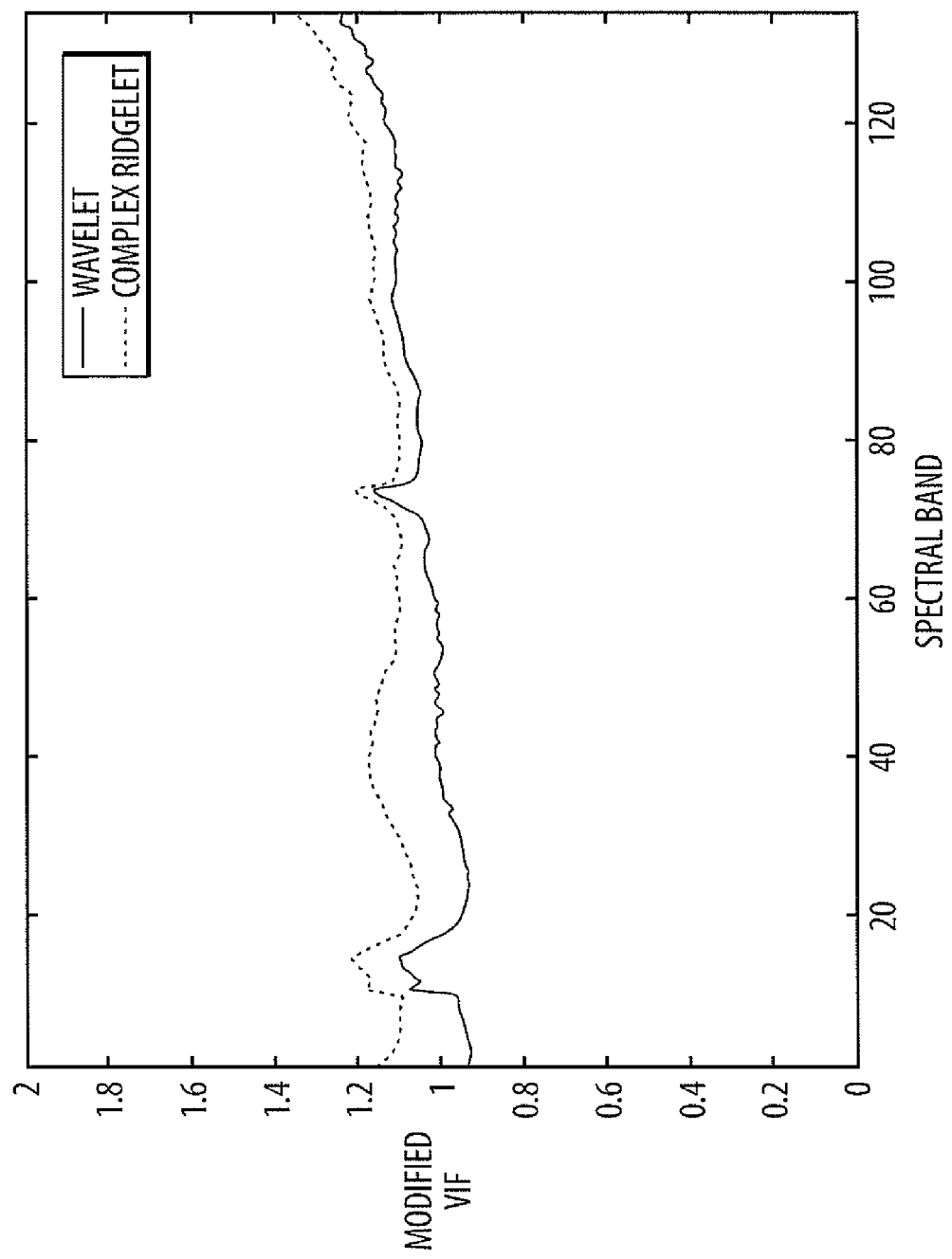
FIG. 15 is a graph of MVIF values of the band images after enhancing spatial resolution using the complex ridgelet transform based method and the wavelet based method for the Target datacube.
Figure 16:
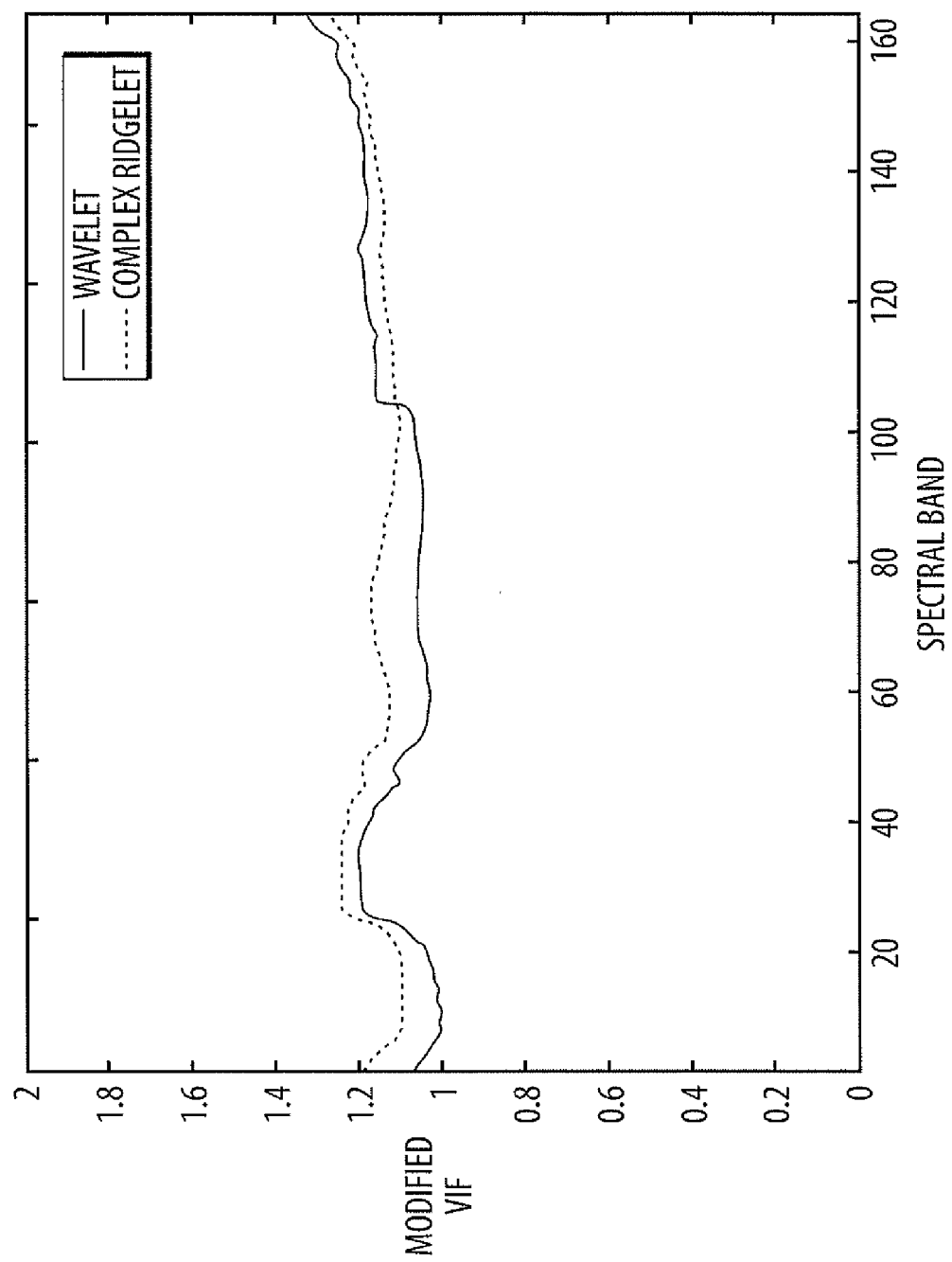
FIG. 16 is a graph of MVIF values of the band images after enhancing spatial resolution using the complex ridgelet transform based method and the wavelet based method for the Key Lake datacube.

FIGS. 15 and 16 show the MVIF values of the band images of the Target (FIG. 15) and Key Lake (FIG. 16) datacubes after enhancing spatial resolution using the complex ridgelet transform based method. In the figures, the MVIF values of spatial resolution enhanced band images using the wavelet based method are also shown for the sake of comparison. The HR image used is the single band HR image produced using Method 3 (i.e. synthetic images derived based on closeness of pixel intensity) with image organizing Scheme 2, since this HR image showed the best MVIF of single band image in exploiting keystone characteristic.

It is also necessary to normalize the intensity of each of the band images of the datacubes to that of the HR image before enhancing the spatial resolution using the complex ridgelet transform based method, since the intensity of a band image varies with the spectral band number. It should be noted that for the Target datacube bands 1-5, 110-170, 231-240 have been removed due to water absorption peaks and extremely low SNR in those bands. Similarly, for the Key Lake datacube bands 1-10, 30-50, 115-170, and 231-240 have been removed. It can be seen from the figures that the complex ridgelet transform based method produces better HR band images than those produced using the wavelet transform based method in terms of MVIF. Table 3 tabulates the overall MVIF value for an entire datacube using the complex ridgelet and the wavelet methods.

The reason that the overall MVIF of the two spatial resolution enhanced datacubes is greater than the MVIF of the single HR image obtained by exploiting the keystone characteristic is that the MVIF of the noisy band images of the enhanced datacubes is improved significantly after fusing with the HR image. The overall MVIF of the enhanced datacube is the average MVIFs of all the band images after spatial resolution enhancement.

TABLE 3

Overall MVIF of an entire datacube using the complex ridgelet transform based method and the wavelet based method.

| Datacube | Complex ridgelet | Wavelet |
| --- | --- | --- |
| Target | 1.14 | 1.05 |
| Key Lake | 1.15 | 1.12 |

Summary

This disclosure presented a unique technology that can increase spatial resolution of multi-dimensional optical sensor data without using the additional images as would be the case for image fusion. The technology exploits the intrinsic information of the sensor that acquired the imagery and uses it as additional information to increase the spatial resolution. Since the multiple images of the same scene are no longer required, the technology is independent of the requirement to geometrically register and normalize the radiometry of the images.

The inter-band spatial mis-registration or distortion (often referred to as "keystone") of the sensor that acquired the imagery is exploited and used as additional information to create a high spatial resolution image. Then the high spatial resolution image can be used to increase the spatial resolution of each band image of the entire data cube. In exploiting the sensor's keystone characteristics three non-limiting methods have been developed to derive sub-pixel shifted images from the datacube in order to create the high spatial resolution image. Two non-limiting schemes of organizing the sub-pixel shifted images are developed for creating the high spatial resolution image. While only three methods of deriving sub-pixel shifted images and two schemes of organizing the sub-pixel images have been described, it is to be understood that this disclosure is not limited to those methods and schemes. Other methods and schemes are feasible. A complex ridgelet transform based method is utilized to fuse the high spatial resolution image to each band image of the datacube. Experimental results show that the technology can increase the spatial resolution of acquired multi-dimensional optical sensor data by at least a factor of 2×2.

While the present disclosure is sometimes described in terms of methods, a person of ordinary skill in the art will understand that the present disclosure is also directed to various apparatus including components for performing at least some of the aspects and features of the described methods, be it by way of hardware components, software or any combination of the two, or in any other manner. Moreover, an article of manufacture for use with the apparatus, such as a pre-recorded storage device or other similar computer readable medium including program instructions recorded thereon may direct an apparatus to facilitate the practice of the described methods. It is understood that such apparatus, articles of manufacture also come within the scope of the present disclosure.

Figure 17:
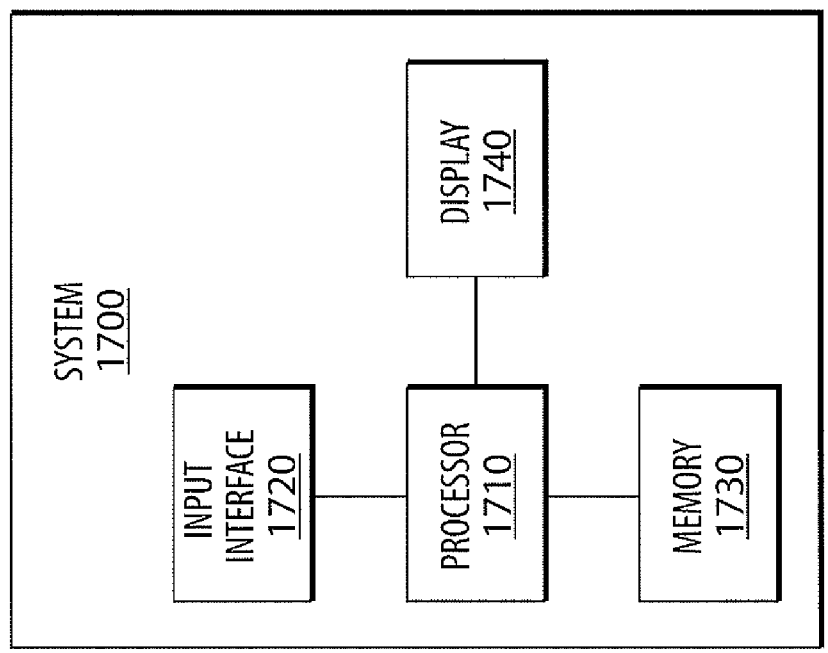
FIG. 17 is a block diagram of a system according to one embodiment.

One embodiment of a system for implementing the methods disclosed will now be described with reference to FIG. 17. The system 1700 comprises a processor 1710; an input interface 1720; a memory 1730 and a display 1740, such as liquid crystal display (LCD), plasma display panel (PDP), cathode ray tube (CRT), field emission display (FED), organic light-emitting diodes (OLED), surface-conduction electron-emitter display (SED). Non-limiting examples of a processor 1710 include a CPU (Central Processing Unit) such as multi-core CPU, graphical processing unit (GPU), general-purpose signal processor (GSP), field programmable gated array (FPGA), application specific integrated circuit (ASIC). The input interface 1720 is for receiving a multidimensional imagery. Non-limiting examples include a USB port, a wireless receiver. The memory 1730 has computer-readable instructions, such as assembly languages, C, C++, Java, Basic, VHDL, Matlab, stored thereon that when executed by the processor cause the processor to: receive the multidimensional imagery from the input interface; implement any one of the methods described herein; and output the fused image to the display. In some embodiments, the fused image is also output to a printer.

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to generate alternative embodiments comprised of a sub-combination of features which may not be explicitly described above. In addition, features from one or more of the above-described embodiments may be selected and combined to generate alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method for increasing spatial resolution of a hyperspectral data cube imagery, the method comprising:
    extracting a single baseline image from the hyperspectral data cube imagery;
    deriving n×m−1 keystone induced sub-pixel shifted images from the hyperspectral data cube imagery, where n and m are integers and greater than 1;
    organizing the single baseline image and the n×m−1 sub-pixel shifted images that are derived from the hyperspectral data cube imagery into an organized image array having a 1/n, 2/n, . . . (n−1)/n pixel shift in horizontal direction and 1/m, 2/m, . . . (m−1)/m in vertical direction in relation to the single baseline image;
    fusing the organized image array using iterative back projection (IBP) to generate a finer resolution image; and
    outputting the generated finer resolution image.

2. The method of claim 1, wherein obtaining the baseline image comprises selecting and extracting a band image from the hyperspectral data cube imagery from a region of spectral band images with relative high intensity amplitude and a flat intensity variation.

3. The method of claim 1, wherein deriving the n×m−1 sub-pixel shifted images comprises selecting and extracting n×m−1 spectral band images from the data cube imagery according to a predefined amount of keystone induced sub-pixel shift between the baseline image and the selected band images.

4. The method of claim 1, wherein deriving the n×m−1 sub-pixel shifted images comprises deriving n×m−1 synthetic images, each synthetic image being composed of columns extracted from different spectral band images, all of the columns of each synthetic image having close to the predefined pixel shift related to the baseline image.

5. The method of claim 1, wherein deriving the n×m−1 sub-pixel shifted images comprises deriving n×m−1 synthetic images, each of the n×m−1 synthetic images comprising each pixel having $1^{st}$, $2^{nd}$, until $(n \times m-1)^{th}$ closest intensity to the pixel at the same location of the baseline image in all spectral bands of the hyperspectral data cube imagery.

6. The method of claim 1, further comprising normalizing the n×m−1 sub-pixel shifted images with respect to the single baseline image.

7. The method of claim 1, wherein for a spatial resolution enhancement factor of n×m, organizing the single baseline image and the n×m−1 sub-pixel shifted images comprises:
    placing the baseline image as the leftmost sub-pixel shifted image in the $1^{st}$ line of the organized image array;
    correcting a first of the n×m−1 sub-pixel shifted images to a zero keystone shift in relation to the baseline image;
    shifting the corrected image down 1/m pixels and placing the image as the leftmost sub-pixel shifted image in the $2^{nd}$ line of the organized image array;
    correcting an image of the n×m−1 sub-pixel shifted images to a zero keystone shift in relation to the baseline image;
    shifting the corrected image down until (m−1)/m pixels and placing the (m−1)/m down shifted image as the leftmost sub-pixel shifted image in the $m^{th}$ line of the organized image array;
    resampling an image of the n×m−1 sub-pixel shifted images to a 1/n right shift and placing the 1/n right shifted image as the $2^{nd}$ leftmost sub-pixel shifted image in the $1^{st}$ line of the organized image array;
    resampling an image of the n×m−1 sub-pixel shifted images to a (n−1)/n right shift and placing the (n−1)/n right shifted image as the $n^{th}$ sub-pixel shifted image in the $1^{st}$ line of the organized image array; and
    resampling an image of the n×m−1 sub-pixel shifted images to a (n−1)/n right shift and to a (m−1)/m down shift and placing the (n−1)/n right shifted, (m−1)/m down shifted image as the $n^{th}$ sub-pixel shifted image in the $m^{th}$ line of the organized image array.

8. The method of claim 1, wherein for a spatial resolution enhancement factor of n×m, organizing the single baseline image and the n×m−1 sub-pixel shifted images comprises:
    correcting a first of the n×m−1 sub-pixel shifted images to a zero keystone shift in relation to the baseline image;
    shifting the corrected image down 1/m pixels and placing the 1/m down shifted image as the leftmost sub-pixel shifted image in the $2^{nd}$ line of the organized image array;
    correcting an image of the n×m−1 sub-pixel shifted images to a zero keystone shift in relation to the baseline image;
    shifting the corrected image down until (m−1)/m pixels and placing the (m−1)/m down shifted image as the leftmost sub-pixel shifted image in the $m^{th}$ line of the organized image array;
    resampling (n−1) images of the n×m−1 sub-pixel shifted images to a 1/m down shift and placing the (n−1) resampled 1/m down shifted images as the sub-pixel shifted images in the $2^{nd}$ line of the organized image array; and resampling (n−1) images of the n×m−1 sub-pixel shifted images to a (m−1)/m down shift and placing the (n−1) resampled (m−1)/m down shifted images as the sub-pixel shifted images in the $m^{th}$ line of the organized image array.

9. The method of claim 8, wherein for a spatial resolution enhancement factor of n×m, each of the n−1 sub-pixel shifted images is shifted by approximately j/m in a vertical direction, where j is an integer from 1 to m−1.

10. The method of claim 8, wherein placing the (n−1) resampled j/m down shifted images as the sub-pixel shifted images in the $(j+1)^{th}$ line of the organized image array comprises placing the (n−1) sub-pixel shifted images from left to right of the organized image array based on the order the amount of keystone induced shift from small to large, where j is an integer from 1 to m−1.

11. The method of claim 1, wherein the IBP comprises 10 or more iterations.

12. The method of claim 1, further comprising fusing the generated finer resolution image to each of the plurality of spectral band images of the data cube imagery and outputting an entire spatial resolution enhanced data cube imagery.

13. The method of claim 12 wherein fusing the generated finer resolution image to each of the plurality of spectral band images comprises:
performing a Radon transform on the generated finer resolution image and on each of the plurality of spectral band images to produce a Radon slice for the finer resolution image and each spectral band image;
applying a dual-tree complex wavelet transform (DTCWT) to each Radon slice to produce a complex ridgelet coefficients (CRC) for each Radon slice;
fusing the CRC corresponding to the generated finer resolution image with the CRCs corresponding to each of the plurality of spectral band images; and
performing an inverse complex ridgelet transform to generate the enhanced spatial resolution data cube imagery.

14. The method of claim 12, further comprising normalizing an intensity of each of the plurality of spectral band images before fusing the finer resolution image to the respective spectral band image.

15. The method of claim 12, further comprising extending the spatial resolution of each of the plurality of spectral band images prior to fusing the generated finer resolution image to the respective spectral band image.

16. The method of claim 12, wherein the plurality of spectral band images comprises all spectral band images for the hyperspectral data cube imagery.

17. The method of claim 12, wherein the plurality of spectral band images comprises a set of spectral band images from the hyperspectral data cube imagery that meet at least one predefined criterion.

18. A non-transitory computer-readable medium having computer-readable instructions stored thereon that when executed by a processor cause the processor to increase spatial resolution of a hyperspectral data cube imagery by:
extracting a single baseline image from the hyperspectral data cube imagery;
deriving n×m−1 keystone induced sub-pixel shifted images from the hyperspectral data cube imagery, where n and m are integers and greater than 1;
organizing the single baseline image and the n×m−1 sub-pixel shifted images from the hyperspectral data cube imagery into an organized image array having a 1/n, 2/n, ... (n−1)/n pixel shift in horizontal direction and 1/m, 2/m, ... (m−1)/m in vertical direction in relation to the single baseline image;
fusing the organized image array using iterative back projection (IBP) to generate a finer resolution image; and
outputting the generated finer resolution image.

19. A system for increasing spatial resolution of a hyperspectral data cube imagery, the system comprising:
a processor;
an input interface for receiving the hyperspectral data cube imagery;
a display; and
a memory having computer-readable instructions stored thereon that when executed by the processor cause the processor to: receive the hyperspectral data cube imagery from the input interface; extract a single baseline image from the hyperspectral data cube imagery; derive n×m−1 keystone induced sub-pixel shifted images from the hyperspectral data cube imagery, where n and m are integers and greater than 1; organize the single baseline image and the n×m−1 sub-pixel shifted images from the hyperspectral data cube imagery into an organized image array having a 1/n, 2/n, ... (n−1)/n pixel shift in horizontal direction and 1/m, 2/m, ... (m−1)/m in vertical direction in relation to the single baseline image; fuse the organized image array using iterative back projection (IBP) to generate a finer resolution image; and output the generated finer resolution image to the display.

* * * * *